(12) United States Patent
Zhang et al.

(10) Patent No.: US 11,671,947 B2
(45) Date of Patent: *Jun. 6, 2023

(54) RECEPTION APPARATUS AND RECEPTION METHOD

(71) Applicant: Sun Patent Trust, New York, NY (US)

(72) Inventors: Zhi Zhang, Beijing (CN); Ming Xu, Beijing (CN); Masayuki Hoshino, Kanagawa (JP); Daichi Imamura, Kanagawa (JP); Akihiko Nishio, Osaka (JP)

(73) Assignee: SUN PATENT TRUST, New York, NY (US)

( * ) Notice: Subject to any disclaimer, the term of this patent is extended or adjusted under 35 U.S.C. 154(b) by 165 days.

This patent is subject to a terminal disclaimer.

(21) Appl. No.: 17/210,269

(22) Filed: Mar. 23, 2021

(65) Prior Publication Data

US 2021/0258939 A1   Aug. 19, 2021

Related U.S. Application Data

(63) Continuation-in-part of application No. 16/912,430, filed on Jun. 25, 2020, now Pat. No. 10,993,223, (Continued)

(30) Foreign Application Priority Data

Jul. 15, 2011   (CN) ................. PCT/CN2011/077203

(51) Int. Cl.
*H04W 72/04* (2023.01)
*H04L 25/02* (2006.01)
(Continued)

(52) U.S. Cl.
CPC ......... *H04W 72/044* (2013.01); *H04L 5/0016* (2013.01); *H04L 5/0051* (2013.01);
(Continued)

(58) Field of Classification Search
CPC . H04L 25/0226; H04L 5/0051; H04L 5/0016; H04L 27/2613; H04W 72/044;
(Continued)

(56) References Cited

U.S. PATENT DOCUMENTS 6,351,538 B1   2/2002   Uz
8,544,269 B2   10/2013   Takahashi et al.
(Continued)

FOREIGN PATENT DOCUMENTS

CN   101779511 A   7/2010
CN   101997568 A   3/2011
(Continued)

OTHER PUBLICATIONS

3GPP TS 36.212 V 10.2.0, "3rd Generation Partnership Project; Technical Specification Group Radio Access Network; Evolved Universal Terrestrial Radio Access (E-UTRA); Multiplexing and channel coding (Release 10)," Jun. 2011, 78 pages.
(Continued)

*Primary Examiner* — Maharishi V Khirodhar
*Assistant Examiner* — Kenneth P Hunt
(74) *Attorney, Agent, or Firm* — Seed IP Law Group LLP

(57) ABSTRACT

Method of scrambling signals, transmission point device, and user equipment using the method are provided. The method includes: sending an ID table to a user equipment through higher layer signaling, the ID table being a subset of the whole ID space and containing available IDs for the user equipment; notifying the user equipment an ID in the ID table to be used through physical layer signaling or UE specific higher layer signaling; generating a random seed based on the notified ID; initializing a scrambling sequence by the random seed; and scrambling the signals with the initialized scrambling sequence. The method of the disclosure, by combining physical layer signaling and higher layer
(Continued)

signaling, may notify the used group ID and the blind detection space to a UE, wherein the blind detection for the UE is enabled and the signaling overhead is reduced.

12 Claims, 14 Drawing Sheets

Related U.S. Application Data which is a continuation of application No. 16/685,831, filed on Nov. 15, 2019, now Pat. No. 10,736,095, which is a continuation of application No. 16/365,140, filed on Mar. 26, 2019, now Pat. No. 10,517,089, which is a continuation of application No. 16/010,125, filed on Jun. 15, 2018, now Pat. No. 10,292,153, which is a continuation of application No. 15/709,215, filed on Sep. 19, 2017, now Pat. No. 10,028,270, which is a continuation of application No. 15/053,963, filed on Feb. 25, 2016, now Pat. No. 9,820,274, which is a continuation of application No. 14/115,325, filed as application No. PCT/CN2011/080372 on Sep. 29, 2011, now Pat. No. 9,306,712.

(51) Int. Cl.
| | | |
|---|---|---|
| *H04L 27/26* | (2006.01) | |
| *H04L 5/00* | (2006.01) | |
| *H04W 72/12* | (2023.01) | |
| *H04W 72/044* | (2023.01) | |
| *H04W 72/121* | (2023.01) | |

(52) U.S. Cl.
CPC ...... *H04L 25/0226* (2013.01); *H04L 27/2613* (2013.01); *H04W 72/121* (2013.01)

(58) Field of Classification Search
CPC .. H04W 72/121; H04J 11/003; H04J 11/0079; H04J 2011/0006; H04J 11/005
See application file for complete search history.

(56) References Cited

U.S. PATENT DOCUMENTS

| | | |
|---|---|---|
| 8,755,339 B2 | 6/2014 | Li et al. |
| 8,948,097 B2 | 2/2015 | Chen et al. |
| 9,306,712 B2 | 4/2016 | Zhang et al. |
| 9,820,274 B2 | 11/2017 | Zhang et al. |
| 10,028,270 B2 | 7/2018 | Zhang et al. |
| 10,292,153 B2 | 5/2019 | Zhang et al. |
| 10,517,089 B2 | 12/2019 | Zhang et al. |
| 10,993,223 B2 * | 4/2021 | Zhang ............... H04L 25/0226 |
| 2010/0246510 A1 | 9/2010 | Ishii et al. |
| 2010/0322178 A1 | 12/2010 | Li et al. |
| 2011/0038310 A1 | 2/2011 | Chmiel et al. |
| 2011/0077038 A1 | 3/2011 | Montojo et al. |
| 2011/0085503 A1 | 4/2011 | Nam et al. |
| 2011/0103250 A1 | 5/2011 | Li et al. |
| 2011/0192161 A1 | 8/2011 | Takahaski et al. |
| 2011/0237267 A1 | 9/2011 | Chen et al. |
| 2013/0034064 A1 | 2/2013 | Nam et al. |
| 2013/0215835 A1 | 8/2013 | Chen et al. |
| 2013/0235819 A1 | 9/2013 | Zhang |
| 2014/0211754 A1 | 7/2014 | Li et al. |
| 2014/0293943 A1 | 10/2014 | Yoon |
| 2015/0049704 A1 | 2/2015 | Park et al. |
| 2015/0230259 A1 | 8/2015 | Park et al. |

FOREIGN PATENT DOCUMENTS

| | | |
|---|---|---|
| CN | 102118811 A | 7/2011 |
| EP | 2 264 937 A2 | 12/2010 |
| WO | 2010/041544 A1 | 4/2010 |
| WO | 2010/147419 A1 | 12/2010 |
| WO | 2011/041544 A2 | 4/2011 |
| WO | 2011/053073 A2 | 5/2011 |

OTHER PUBLICATIONS

Communication pursuant to Rule 164(1) EPC, dated Aug. 17, 2016, for corresponding EP Application No. 11869555.0-1505 / 2695346, 9 pages.

Communication pursuant to Article 94(3) EPC, dated Mar. 11, 2020, for European Application No. 19168406.7-1220, 5 pages.

ETSI TS 136 211 V10.2.0, LTE; Evolved Universal Terrestrial Radio Access (E-UTRA); Physical channels and modulation (3GPP TS 36.211 version 10.2.0 Release 10), Jun. 2011, 105 pages.

International Search Report dated Apr. 26, 2012 for corresponding International Application No. PCT/CN2011/080372, 2 pages.

Samsung, "Scrambling sequence for CoMP," R1-101178, 3GPP TSG RAN WG1 meeting #60, Agenda Item: 7.2.5, San Francisco, USA, Feb. 22-26, 2010, 3 pages.

Samsung, "Updates and Corrections for DCI Formats," R1-111444, 3GPP TSG-RAN WG1 #65, Barcelona, Spain, May 9-13, 2011, 19 pages.

* cited by examiner

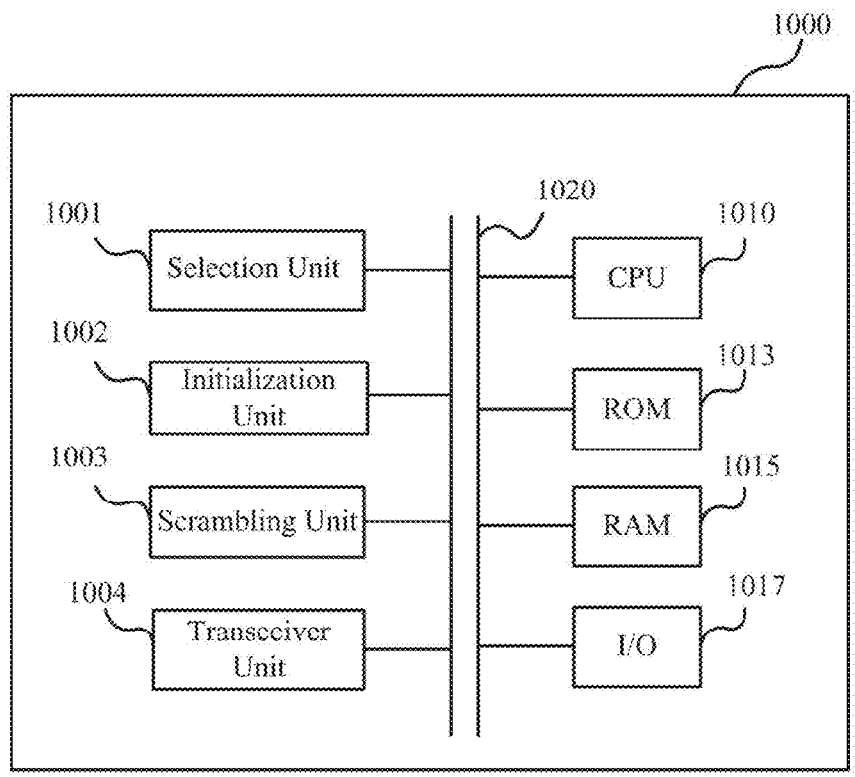

Fig. 10

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, SCID=0 | 0 | 2 layers, ports 7-8, SCID=0 |
| 1 | 1 layer, port 7, SCID=1 | 1 | 2 layers, ports 7-8, SCID=1 |
| 2 | 1 layer, port 8, SCID=0 | 2 | 3 layers, ports 7-9, SCID=0 |
| 3 | 1 layer, port 8, SCID=1 | 3 | 4 layers, ports 7-10, SCID=0 |
| 4 | 2 layers, ports 7-8, SCID=0 | 4 | 5 layers, ports 7-11, SCID=0 |
| 5 | 3 layers, ports 7-9, SCID=0 | 5 | 6 layers, ports 7-12, SCID=0 |
| 6 | 4 layers, ports 7-10, SCID=0 | 6 | 7 layers, ports 7-13, SCID=0 |
| 7 | Reserved | 7 | 8 layers, ports 7-14, SCID=0 |

Fig. 11

| | One Codeword: Codeword 0 enabled, Codeword 1 disabled | | Two Codewords: Codeword 0 enabled, Codeword 1 enabled |
|---|---|---|---|
| Value | Rel-11 Message | Value | Rel-11 Message |
| 0 | 1 layer, port 7, UE specific seed | 0 | 2 layers, ports 7-8, UE specific seed |
| 1 | 1 layer, port 7, rel-10 seed (SCID=0) | 1 | 2 layers, ports 7-8, , rel-10 seed (SCID=0) |
| 2 | 1 layer, port 8, UE specific seed | 2 | 3 layers, ports 7-9, UE specific seed |
| 3 | 1 layer, port 8, , rel-10 seed (SCID=0) | 3 | 4 layers, ports 7-10, UE specific seed |
| 4 | 2 layers, ports 7-8, UE specific seed | 4 | 5 layers, ports 7-11, UE specific seed |
| 5 | 3 layers, ports 7-9, UE specific seed | 5 | 6 layers, ports 7-12, UE specific seed |
| 6 | 4 layers, ports 7-10, UE specific seed | 6 | 7 layers, ports 7-13, UE specific seed |
| 7 | Reserved | 7 | 8 layers, ports 7-14, UE specific seed |

Fig. 12

| One Codeword: | |
|---|---|
| Value | Message, Rel-11 |
| 0 | port 7, $SCID$=0, rel-10 seed |
| 1 | port 7, $SCID$=1, rel-10 seed |
| 2 | port 8, $SCID$=0, rel-10 seed |
| 3 | port 8, $SCID$=1, rel-10 seed |
| 4 | 2 layers, UE specific seed |
| 5 | 3 layers, UE specific seed |
| 6 | 4 layers, UE specific seed |
| 7 | port 7, UE specific seed |

Fig. 13

|  | Index | Group id |
|---|---|---|
| Set 1 | 0 | id 0 |
|  | 1 | id 1 |
| Set 2 | 2 | id 2 |
|  | 3 | id 3 |

Fig. 17

| One Codeword: | | |
|---|---|---|
| Value | Message, Rel-10 | Message, Rel-11 |
| 0 | port 7, $nSCID$=0 | Port 7, index 0 |
| 1 | port 7, $nSCID$=1 | Port 7, index 1 |
| 2 | port 8, $nSCID$=0 | Port 8, index 0 |
| 3 | port 8, $nSCID$=1 | Port 8, index 1 |

Fig. 18

| One Codeword: | | |
|---|---|---|
| Value | Message, Rel-10 | Message, Rel-11 |
| 7 | reserved | Indicate the switch of interfering random seed space: set 1 or set 2 |

Fig. 19

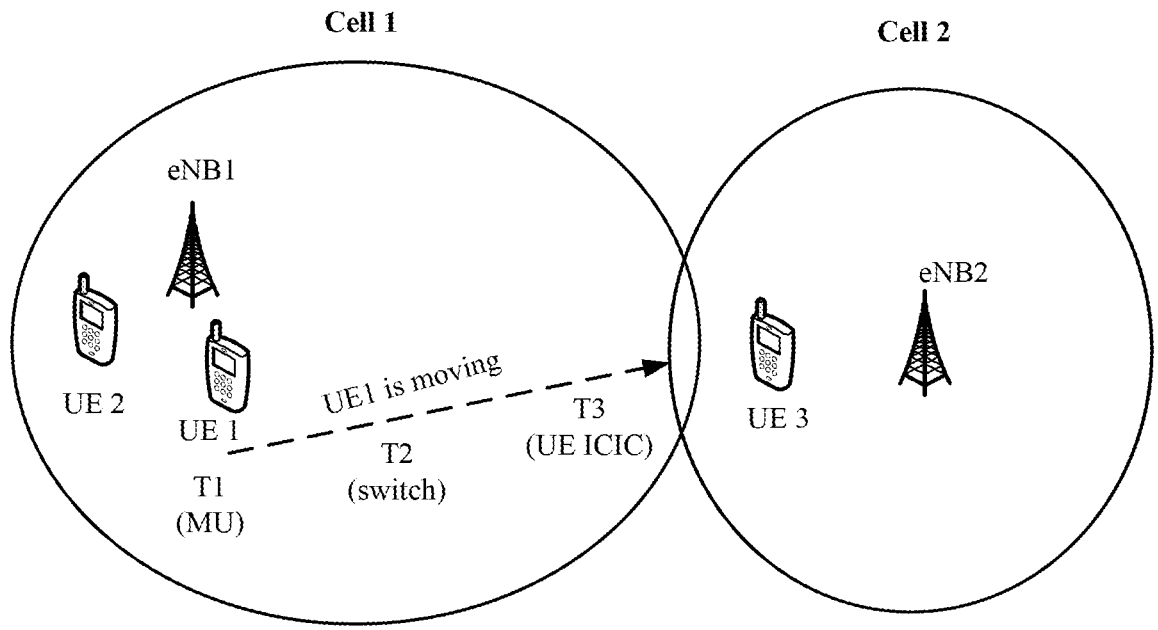
UE1 is configured by RRC with Table
|  | Index | Group id |
|---|---|---|
| Serving cell | 0 | id 0 |
|  | 1 | id 1 |
| Interfering cell | 2 | id 2 |
|  | 3 | id 3 |
UE3 is configured by RRC with Table
|  | Index | Group id |
|---|---|---|
| Serving cell | 0 | id 2 |
|  | 1 | id 3 |
| Interfering cell | 2 | id 0 |
|  | 3 | id 1 |
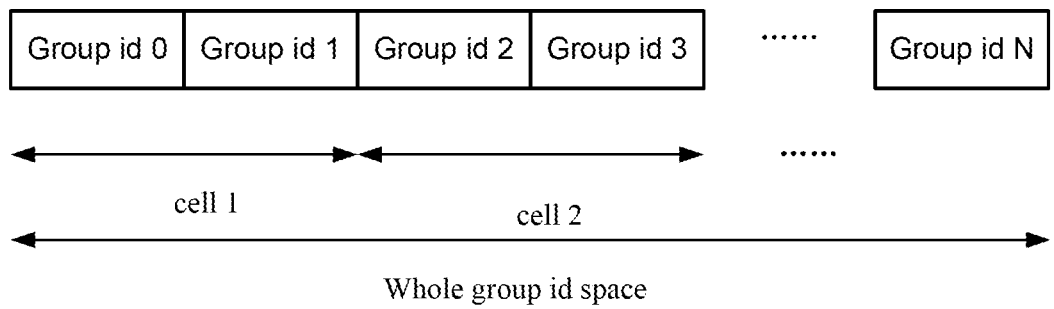
Fig. 20A

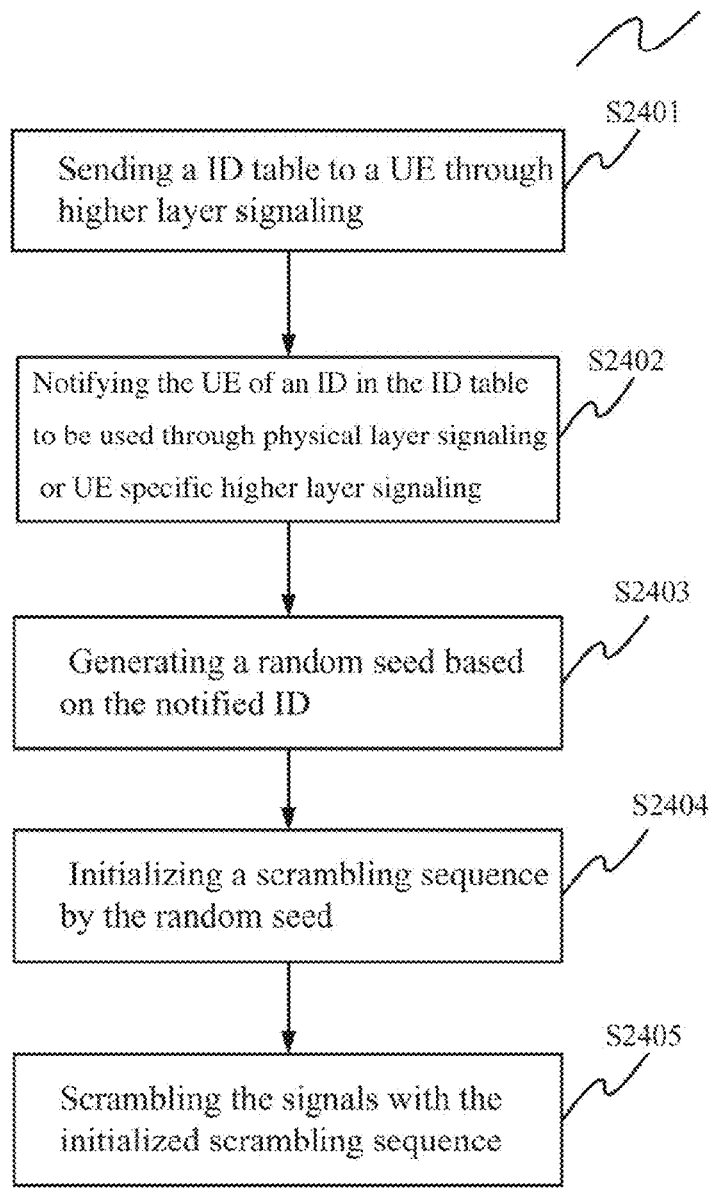

RECEPTION APPARATUS AND RECEPTION METHOD

BACKGROUND

Technical Field

The present disclosure relates to the field of signals multiplexing method and reference signal design in communication system.

Description of the Related Art

DMRS (Demodulation Reference Signal) or UE (User Equipment) specific reference signal is one of RS (Reference Signals) used in LTE-A (Long-Term Evolution-Advanced) (release-10, release-11, etc.). DMRS is the same precoded as the data part in a LTE-A system, so it can provide the channel estimation for demodulation.

FIG. 1 is a schematic diagram showing an example of DMRS multiplexed. FIG. 1 shows a structure of RB (resource block) and DMRS. In FIG. 1, there is shown one RB. The abscissa axis (T) of the RB represents time (OFDM symbols), and its vertical axis (F) represents width of frequency band (sub-carriers). For the RB, the abscissa axis is divided into 14 sections, each of which forms an OFDM symbol in the vertical axis direction. The vertical axis is divided into 12 sections, each of which forms a sub-carrier in the abscissa axis direction. Each small block within the RB represents a RE (resource element), and all 12×14 REs of the RB form a sub-frame, which includes slot 1 and slot 2 along the abscissa axis direction. It is shown in FIG. 1 that the first three symbols from the left side of the RB are used as a control region. The remaining part of the RB is used to transmit data part, wherein the predetermined number of DMRSs are included in the RB, and allocated in different predetermined locations of the RB.

It is shown in FIG. 1 that DMRSs are multiplied with OCC (orthogonal cover code) and scrambling sequence, respectively. FIG. 1 gives DMRS examples of both rank 1 and rank 2 cases. For the rank 1 case, DMRS can use OCC [1,1] or OCC [1,−1] for its only one layer; for the rank 2 case, DMRS uses both OCC [1,1] and OCC [1,−1] which are used for one of layers of DMRS respectively. Because two OCCs are orthogonal to each other, for the rank 2 case, although two layers of DMRS occupy the same frequency/time REs, the orthogonality between the two OCCs still guarantees that two layers of DMRS are orthogonal to each other. It is noted that different layers of DMRS can be called different DMRS ports. For example, in FIG. 1, DMRS using OCC [1,1] can be called port 7 and DMRS using OCC [1,−1] can be called port 8. When only port 7 or port 8 is used, it is the rank 1 case; when both port 7 and port 8 are used, it is the rank 2 case.

On top of the OCC, there is a scrambling sequence [a1, a2, a3 . . . , b1, b2, b3 . . . ] initialized by a random seed. In FIG. 1, in one RE, port 7 and 8 use the same scrambling sequence. The term "same scrambling sequence" here means that the scrambling sequence is initialized by the same random seed. It is well known that a random seed in release-10 is calculated by the following equation (1), $$\text{random seed} = (\lfloor n_s/2 \rfloor + 1) \cdot (2\text{cell\_}id + 1) \cdot 2^{16} + \text{SCID} \quad (1)$$

wherein, $n_s$ represents the slot number (2 slots in FIG. 1 constitute one subframe), cell_id represents a transmission point ID (cell ID), and SCID is a binary value. As shown from the equation (1), in release-10, the DMRS random seed is decided by the slot number, transmission point ID and a binary value SCID. It is possible that in one transmission point, ports 7 and 8 can be configured with different values of SCID. In such case, port 7 and port 8 will use different scrambling sequences [a1, a2, a3 . . . ] and [b1, b2, b3 . . . ], for example. This mainly intends for MU (multi-user) operation and it will be discussed later.

Because DMRS is the base of demodulation at the receiver side, how to set the DMRS random seed is very important for different scenarios, which will be elaborated on the following.

CoMP Scenario

JT (Joint Transmission) is one technique of CoMP (Coordinate Multiple Points). FIG. 2 is a schematic diagram showing an exemplary JT scenario. It is shown in FIG. 2 that there are two transmission points (or cells) 1 and 2, both of which transmits to one UE (such as a mobile phone, etc.) beams consisting of multiple RBs like the RB shown in FIG. 1. The two RBs in FIG. 2 are simplified representations of the RB in FIG. 1.

The principle of JT operation is illustrated in FIG. 2. In JT operation, different transmission points transmit identical data and DMRS to a UE, and the identical data and DMRS from different transmission points combine over the air. So the UE can enjoy the diversity gain from multiple transmission points. Therefore, for the JT operation, in order to correctly combine signals from the multiple transmission points, identical DMRS from the multiple transmission points are necessary; otherwise, DMRS from the multiple transmission points cannot correctly be combined over the air. In this sense, the same random seed for initializing the scrambling sequence is necessary for JT operation.

However, it is likely that adjacent transmission points (cells) will have different transmission point IDs. For example, in release-10, adjacent transmission points (cells) may have different transmission point (cell) IDs. Because the parameter "cell_id" is involved in the random seed calculation as shown in the above equation (1), if transmission point IDs of different transmission points are different, their DMRS or DMRS scrambling sequences will also be different. Therefore, for JT operation, the key point is how to guarantee the same DMRS random seed for different transmission points having different transmission point IDs.

Non-CoMP Scenario

FIG. 3 is a schematic diagram showing an exemplary non-COMP scenario. Unlike the case of FIG. 2, in FIG. 3, signals transmitted from two adjacent transmission points 1 and 2 are for different UEs, that is, UE 1 and UE2, respectively, i.e., UE1 receives the signals from the transmission point 1, and UE2 receives the signals from the transmission point 2. In non-CoMP operation, since the position of DMRS in a RB is fixed, DMRSs from adjacent transmission points may interfere with each other due to their overlapping in frequency and time resources. For example, as shown in FIG. 3, the signals transmitted from the transmission point 1 to UE 1 and the signals transmitted from the transmission point 2 to UE 2 overlap each other in frequency and time resources, thus their DMRSs interfere with each other (as indicated by dashed arrows in FIG. 3). Therefore, in this case, different DMRS scrambling sequences for adjacent transmission points are necessary to randomize such ICI (inter-cell interference).

However, it is likely that adjacent transmission points (cells) will have the same transmission point ID. For example, in release-11, adjacent transmission points may have the same transmission point ID. Because the parameter "cell_id" is involved in the DMRS random seed calculation as shown in the above equation (1), if adjacent transmission points have the same cell_id, DMRS scrambling sequences will be initialized by the same random seed, and ICI is generated to the DMRS of the adjacent transmission points. Therefore, for non-CoMP operation, the key point is how to guarantee different DMRS random seeds for adjacent transmission points having the same transmission point ID.

FIG. 4 is a schematic diagram showing a comparison between JT scenario and non-CoMP scenario. On the left side of FIG. 4, there is shown a JT scenario where adjacent transmission points have different transmission point IDs. In this case, DMRS random seeds for initializing DMRSs of transmission points 1 and 2 are respectively $(\lfloor n_s/2 \rfloor+1) \cdot (2\text{cell\_id1}+1) \cdot 2^{16}$ and $(\lfloor n_s/2 \rfloor+1) \cdot (2\text{cell\_id2}+1) \cdot 2^{16}$, both of which are obtained from the above equation (1) with a default SCID=0. Here, the parameter cell_id1 represents the transmission point ID of the transmission point 1 while the parameter cell_id2 represents the transmission point ID of the transmission point 2, and cell_id1 is unequal to cell_id2. In order to correctly combine DMRSs from the two transmission points 1 and 2 over the air, their DMRS random seeds are required to be identical especially in the case that their transmission point IDs are not the same. In conclusion, for the JT scenario, the same DMRS seed is necessary because DMRS combining over the air requires identical DMRS of JT transmission points.

On the right side of FIG. 4, there is shown a non-CoMP scenario where adjacent transmission points have the same transmission point ID, i.e. cell_id1. In this case, DMRS random seeds for initializing DMRSs of transmission points 1 and 2 respectively intended for UE1 and UE2 are both $(\lfloor n_s/2 \rfloor+1) \cdot (2\text{cell\_id1}+1) \cdot 2^{16}$, which is obtained from the above equation (1) with a default SCID=0. In order to randomize ICI (as indicated by dashed arrows in FIG. 4) between DMRS from the two transmission points 1 and 2, their DMRS scrambling sequences are required to be different especially in the case that their transmission point IDs are the same. In conclusion, for the non-CoMP, different DMRS seeds are necessary to randomize the ICI from overlapped DMRSs.

For the JT and non-CoMP scenarios as described above, it is concluded that these two scenarios have conflict requirements on DMRS random seed: the JT operation requires the same DMRS random seed while the non-CoMP operation requires different DMRS random seeds.

MU-MIMO Scenario

In addition to the above two scenarios, MU-MIMO (Multi-user Multiple Input-Multiple Output) scenario needs to be considered. FIG. 5 is a schematic diagram showing an exemplary MU-MIMO scenario. The principle of MU-MIMO operation is illustrated in FIG. 5. For MU-MIMO operation, two or more UEs are assigned to the shared frequency/time radio resource. It is shown in FIG. 5 that there are one transmission point and two UEs, that is, UE1 and UE2, both of which share the same frequency/time resource. Because the positions of DMRSs overlap, if one UE such as UE1 can estimate the channel of interfering UE such as UE2 from DMRS, then this UE such as UE1 can cancel the MU interference (as indicated by dashed arrows in FIG. 5) on its side.

Such UE side interference cancellation depends on whether or not a UE can blindly detect the DMRS of interfering UE. FIG. 6 is a schematic diagram showing an exemplary blind detection. The principle of the blind detection is shown in FIG. 6. The freedom of DMRS inside one transmission point (cell) is from 2 aspects: one is from DMRS random seed by setting SCID=0 or 1; the other is from OCC by setting OCC as [1,1] or [1,−1] (or equivalently choosing DMRS port 7 or 8). Specifically, as shown in FIG. 6, assuming that the transmission point ID of the transmission point is cell_id1, it can be obtained that Seed0= $(\lfloor n_s/2 \rfloor+1) \cdot (2\text{cell\_id1}+1) \cdot 2^{16}$ and Seed1= $(\lfloor n_s/2 \rfloor+1) \cdot (2\text{cell\_id1}+1) \cdot 2^{16}+1$ from the above equation (1) with SCID being 0 or 1. Combination of two different DMRS random seeds and two OCCs results in four different DMRSs: Seed0, OCC [1, 1]; Seed0, OCC [1, −1]; Seed1, OCC [1, 1]; Seed1, OCC [1, −1]. Each of the four different DMRSs is used for one UE. For example, as shown in FIG. 6, the DMRS with Seed0 and OCC [1, 1] is used for UE0; the DMRS with Seed0 and OCC [1, −1] is used for UE1; the DMRS with Seed1 and OCC [1, 1] is used for UE2; and the DMRS with Seed1 and OCC [1, −1] is used for UE3. Because there are totally 4 dimensions of DMRS, one UE can blindly detect whether or not there are one or more of other three UEs' DMRSs on the shared resource. This blind detection is feasible since the detection space is limited within 4 dimensions of DMRS. It is not difficult to find that DMRS random seed design largely affects such blind detection. The release-10 DMRS random seed design enables such blind detection, which should be considered as one design aspect for further improvement on DMRS random seed.

BRIEF SUMMARY

In one aspect of the present disclosure, there is provided a method of scrambling signals assigned on predetermined radio resources of at least one layer of resource blocks with the same time and frequency resources, comprising the steps of: generating a random seed based on the equation $$c_{init}=(\lfloor n_s/2 \rfloor+1) \cdot (2*\text{Max}+1) \cdot 2^{16}+(n\_\text{RNTI}+2);$$

initializing a scrambling sequence by the random seed; and scrambling the signals with the initialized scrambling sequence, where Max=Maxim_value(cell_id), which represents the maximum value of transmission point IDs, $c_{init}$ represents the random seed, $n_s$ represents the slot number, and n_RNTI represents a user equipment specific ID.

In another aspect of the present disclosure, there is provided a transmission point device for transmitting to a user equipment signals assigned on predetermined radio resources of at least one layer of resource blocks with the same time and frequency resources, comprising: a random seed generation unit which generates a random seed based on the equation $c_{init}=(\lfloor n_s/2 \rfloor+1) \cdot (2*\text{Max}+1) \cdot 2^{16}+(n\_\text{RNTI}+2)$; an initialization unit which initializes a scrambling sequence by the random seed; a scrambling unit which scrambles the signals with the initialized scrambling sequence; and a transceiver unit which transmits the resource blocks with the scrambled signals to the user equipment, where Max=Maxim_value(cell_id), which represents the maximum value of transmission point IDs, $c_{init}$ represents the random seed, $n_s$ represents the slot number, and n_RNTI represents a user equipment specific ID.

In a further aspect of the present disclosure, there is provided a user equipment for receiving from a transmission point signals assigned on predetermined radio resources of at least one layer of resource blocks with the same time and frequency resources, comprising: a transceiver unit which receives the resource blocks from the transmission point; and a demodulation unit which detects the resource blocks in time domain and/or frequency domain to obtain the signals, wherein, the signals are scrambled by a scrambling sequence initialized by a random seed generated based on the equation $$c_{init}=(\lfloor n_s/2 \rfloor+1) \cdot (2*\text{Max}+1) \cdot 2^{16}+(n\_\text{RNTI}+2),$$

where Max=Maxim_value(cell_id), which represents the maximum value of transmission point IDs, $c_{init}$ represents the random seed, $n_s$ represents the slot number, and n_RNTI represents a user equipment specific ID.

In a further aspect of the present disclosure, there is provided a method of scrambling signals assigned on predetermined radio resources of at least one layer of resource blocks with the same time and frequency resources, comprising the steps of: selecting a random seed from a first random seed generated based on a transmission point ID and a second random seed; initializing a scrambling sequence by the selected random seed; and scrambling the signals with the initialized scrambling sequence.

In a further aspect of the present disclosure, there is provided a transmission point device for transmitting to a user equipment signals assigned on predetermined radio resources of at least one layer of resource blocks with the same time and frequency resources, comprising: a selection unit which selects a random seed from a first random seed generated based on a transmission point ID and a second random seed; an initialization unit which initializes a scrambling sequence by the selected random seed; a scrambling unit for scrambling the signals with the initialized scrambling sequence; and a transceiver unit which transmits the resource blocks with the scrambled signals to the user equipment.

In a further aspect of the present disclosure, there is provided a user equipment for receiving from a transmission point signals assigned on predetermined radio resources of at least one layer of resource blocks with the same time and frequency resources, comprising: a transceiver unit which receives the at least one layer of resource blocks from the transmission point; and a demodulation unit which detects the resource blocks in time domain and/or frequency domain to obtain the signals, wherein, the signals are scrambled by a scrambling sequence initialized by a random seed selected from a first random seed generated based on a transmission point ID and a second random seed.

In a further aspect of the present disclosure, there is provided a method of scrambling signals assigned on predetermined radio resources of at least one layer of resource blocks with the same time and frequency resources, comprising the steps of: sending an ID table to a user equipment through higher layer signaling, the ID table being a subset of a whole ID space and containing available IDs for the user equipment; notifying the user equipment of a ID in the ID table to be used through physical layer signaling or UE specific higher layer signaling; generating a random seed based on the notified ID; initializing a scrambling sequence by the random seed; and scrambling the signals with the initialized scrambling sequence.

In a further aspect of the present disclosure, there is provided a transmission point device for transmitting to a user equipment signals assigned on predetermined radio resources of at least one layer of resource blocks with the same time and frequency resources, comprising: a notification unit which notifies the user equipment of an ID in an ID table to be used through physical layer signaling or UE specific higher layer signaling, wherein the ID table is sent to the user equipment through higher layer signaling, the ID table being a subset of a whole ID space and containing available IDs for the user equipment; a random seed generation unit which generates a random seed based on the notified ID; an initialization unit which initializes a scrambling sequence by the random seed; a scrambling unit which scrambles the signals with the initialized scrambling sequence; and a transceiver unit which transmits the resource blocks with the scrambled signals to the user equipment.

In a further aspect of the present disclosure, there is provided a user equipment for receiving from a transmission point device signals assigned on predetermined radio resources of at least one layer of resource blocks with the same time and frequency resources, comprising: a transceiver unit which receives the resource blocks and physical layer signaling or UE specific higher layer signaling from the transmission point device, wherein the physical layer signaling or the UE specific higher layer signaling notifies the user equipment of a ID in an ID table to be used, wherein the ID table is sent to the user equipment through higher layer signaling, the ID table being a subset of a whole ID space and containing available IDs for the user equipment; a demodulation unit which detects the resource blocks in time domain and/or frequency domain to obtain the signals, wherein, the signals being scrambled by a scrambling sequence initialized by a random seed generated based on the notified ID.

In the present disclosure, by generating random seeds for initializing scrambling sequences for DMRSs based on UE specific IDs or group IDs, identical DMRS from multiple transmission points are guaranteed for the JT scenarios while different DMRSs from adjacent transmission points are guaranteed for the non-CoMP scenarios. Further, by switching between release-10 DMRS random seeds and UE specific DMRS random seeds, the blind detection can be enabled and the orthogonality between UEs can be kept in MU operation, while the conflict requirements for JT and non-CoMP operation can be solved in non-MU operation. Moreover, by combining physical layer signaling and higher layer signaling to notify the used group ID and the blind detection space to a UE, the blind detection for the UE is enabled and the signaling overhead is reduced.

The foregoing is a summary and thus contains, by necessity, simplifications, generalization, and omissions of details; consequently, those skilled in the art will appreciate that the summary is illustrative only and is not intended to be in any way limiting. Other aspects, features, and advantages of the devices and/or processes and/or other subject matters described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 10 is a block diagram showing a transmission point device according to the third embodiment of the present disclosure;

FIG. 11 shows a table for notifying UEs of DMRS ports and DMRS random seeds in release-10 as defined in TS 36.212;

FIG. 12 shows a table for notifying UEs of the selection between release-10 random seeds and UE specific random seeds according to the third embodiment of the present disclosure;

FIG. 13 shows another table for notifying UEs of the selection between release-10 random seeds and UE specific random seeds according to the third embodiment of the present disclosure;

FIG. 17 shows an example of a structured group ID table configured to a UE through higher layer signaling according to the ninth embodiment of the present disclosure;

FIG. 18 shows a table used for Part I of physical layer signaling according to the tenth embodiment of the present disclosure;

FIG. 19 shows a table used for Part III of physical layer signaling according to the tenth embodiment of the present disclosure;

FIGS. 20A and 20B are schematic diagrams showing a complete example where a transmission point use the higher layer signaling and physical layer signaling as defined in the ninth and the tenth embodiments to configure a UE when the UE moves from the center to the edge of the transmission point;

FIG. 23 shows an example of a structured "x" ID table configured to a UE through higher layer signaling according to the twelfth embodiment of the present disclosure; and FIG. 24 is a diagram showing a flow chart of a method of scrambling signals according to the thirteenth embodiment of the present disclosure.

DETAILED DESCRIPTION

Figure 1:
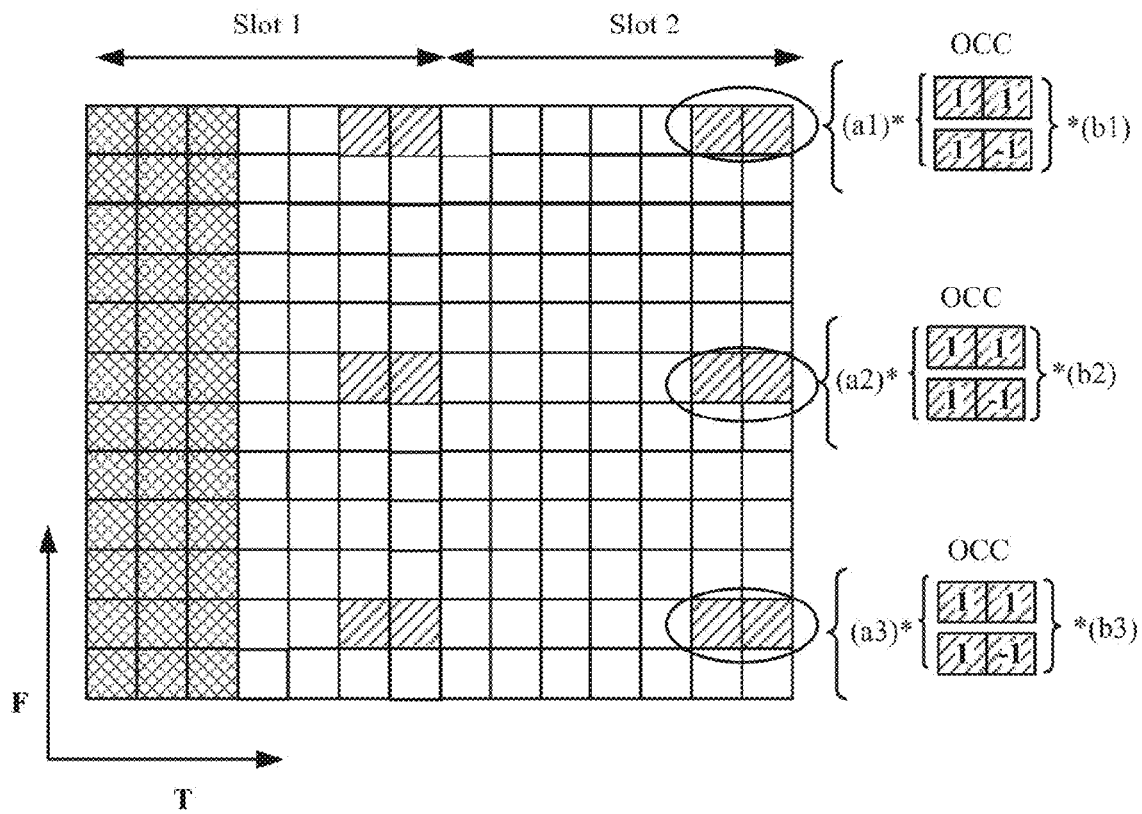
FIG. 1 is a schematic diagram showing an example of DMRS multiplexed.
Figure 2:
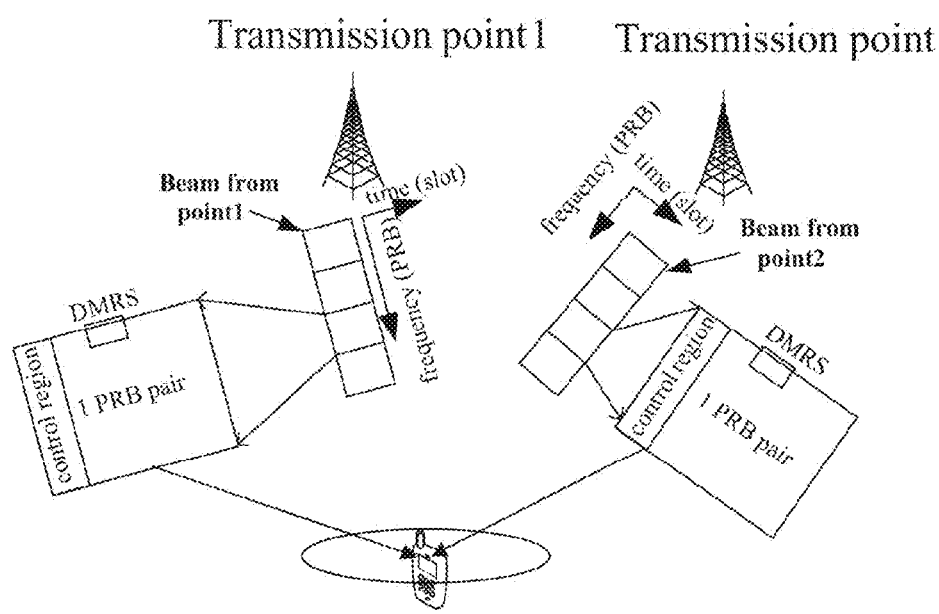
FIG. 2 is a schematic diagram showing an exemplary JT scenario.
Figure 3:
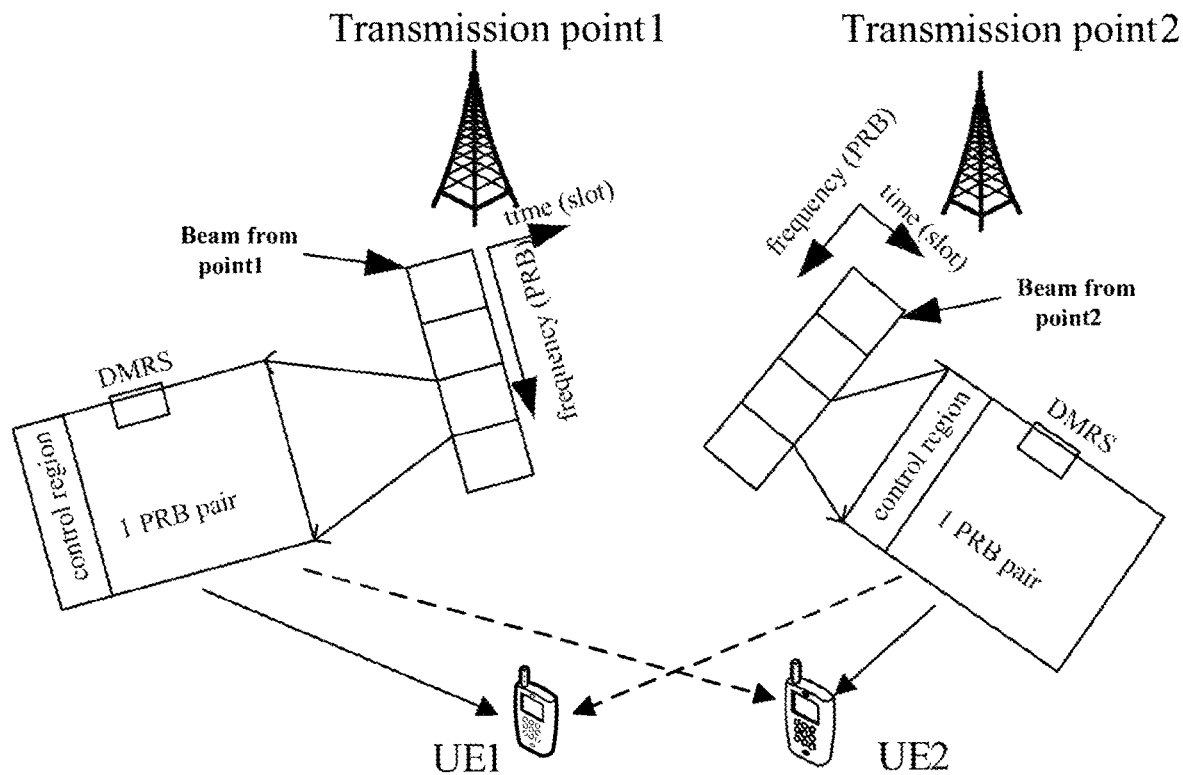
FIG. 3 is a schematic diagram showing an exemplary non-COMP scenario.

In the following detailed description, reference is made to the accompanying drawings, which form a part hereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

First Embodiment

Figure 7:
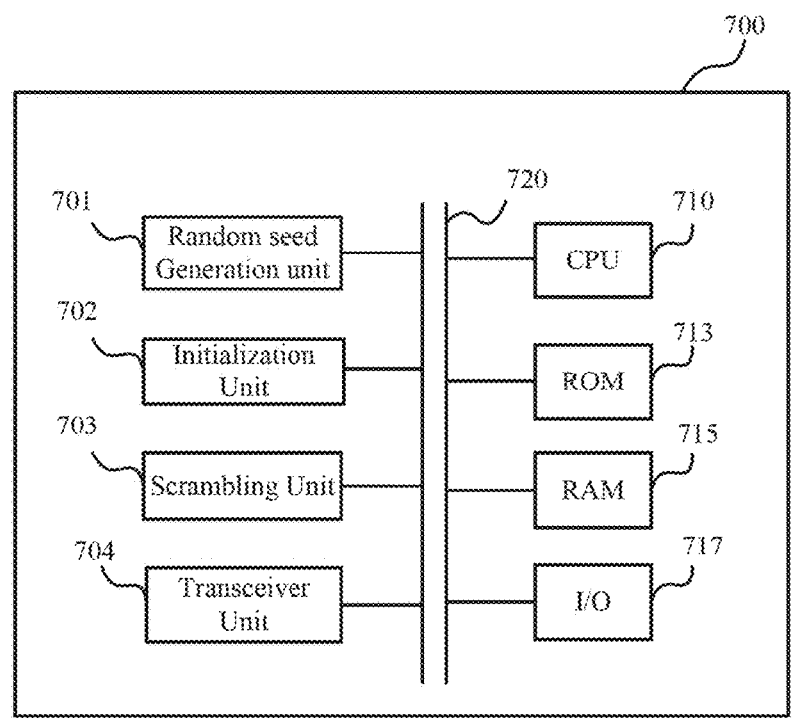
FIG. 7 is a block diagram showing a transmission point device according to the first embodiment of the present disclosure.

FIG. 7 is a block diagram showing a transmission point device according to the first embodiment of the present disclosure.

The transmission point device 700 according to the first embodiment of the present disclosure is used for communicating with a UE in a communication system. The transmission point device 700 transmits, to the UE, RS signals which are assigned on predetermined locations (radio resource, which means the time and/or frequency resource such as sub-carrier, sub-frame, etc.) of at least one layer of resource blocks with the same time and frequency resources. As shown in FIG. 7, the transmission point device 700 may include a random seed generation unit 701, an initialization unit 702, a scrambling unit 703, and a transceiver unit 704. The random seed generation unit 701 generates a random seed based on a UE specific ID. The initialization unit 702 initializes a scrambling sequence by the random seed generated in the random seed generation unit 701. The scrambling unit 703 scrambles the signals with the scrambling sequence initialized in the initialization unit 702. The transceiver unit 704 transmits the resource blocks with the signals scrambled in the scrambling unit 703 to the UE. It should be noted that RS signals here can be any kinds of RS signals such as DMRS and the like. For sake of simplicity, the following description will focus on the DMRS as an example.

The transmission point device 700 according to the present disclosure may further include a CPU (Central Processing Unit) 710 for executing related programs to process various data and control operations of respective units in the transmission point device 700, a ROM (Read Only Memory) 713 for storing various programs required for performing various process and control by the CPU 710, a RAM (Random Access Memory) 715 for storing intermediate data temporarily produced in the procedure of process and control by the CPU 710, and/or a I/O (Input/Output) unit 717 for inputting for outputting various programs, data and so on. The above random seed generation unit 701, initialization unit 702, scrambling unit 703, transceiver unit 704, CPU 710, ROM 713, RAM 715 and/or I/O unit 717 etc. may be interconnected via data and/or command bus 720 and transfer signals between one another.

Respective units as described above do not limit the scope of the present disclosure. According to one embodiment of the disclosure, the function of any of the above random seed generation unit 701, initialization unit 702, scrambling unit 703 and transceiver unit 704 may also be implemented by functional software in combination with the above CPU 710, ROM 713, RAM 715 and/or I/O unit 717 etc.

Since the operations of the initialization unit 702, the scrambling unit 703 and the transceiver unit 704 in the transmission point device 700 are well known to the skilled in the art, the detailed description thereof is omitted here in order to avoid confusing inventive points of the present invention. The detailed description will be given to the operation of the random seed generation unit 701 of the transmission point device 700 below.

The above random seed generation unit 701 generates a random seed for initializing a scrambling sequence for RS signals based on a UE specific ID instead of using a transmission point ID as shown in the equation (1). Here, such a UE specific ID may be a global UE specific identification number such as IMSI (International Mobile Subscriber Identification Number). Alternatively, it may also be a UE specific ID assigned to the UE when the UE accesses to a LTE network, such as c-RNTI (Cell Radio Network Temporary Identifier).

As an example, equation (2) is used for generating a random seed for initializing a scrambling sequence for RS signals, such as DMRS, based on c-RNTI as follows.

$$c_{init}(\lfloor n_s/2 \rfloor+1) \cdot (n\_RNTI) \cdot 2^{16} \quad (2)$$

Wherein, $c_{init}$ represents the generated random seed, $n_s$ represents the slot number, and n_RNTI is a parameter defined in 3GPP TS 36.213, representing a UE specific ID. It is noted that the parameter "c-RNTI" is a subset of "n-RNTI", which represents different RNTIs, and the "n-RNTI" is the "c-RNTI" in most cases. Thereby, the random seed generation unit 701 may generate the random seed from the equation (2).

Figure 4:
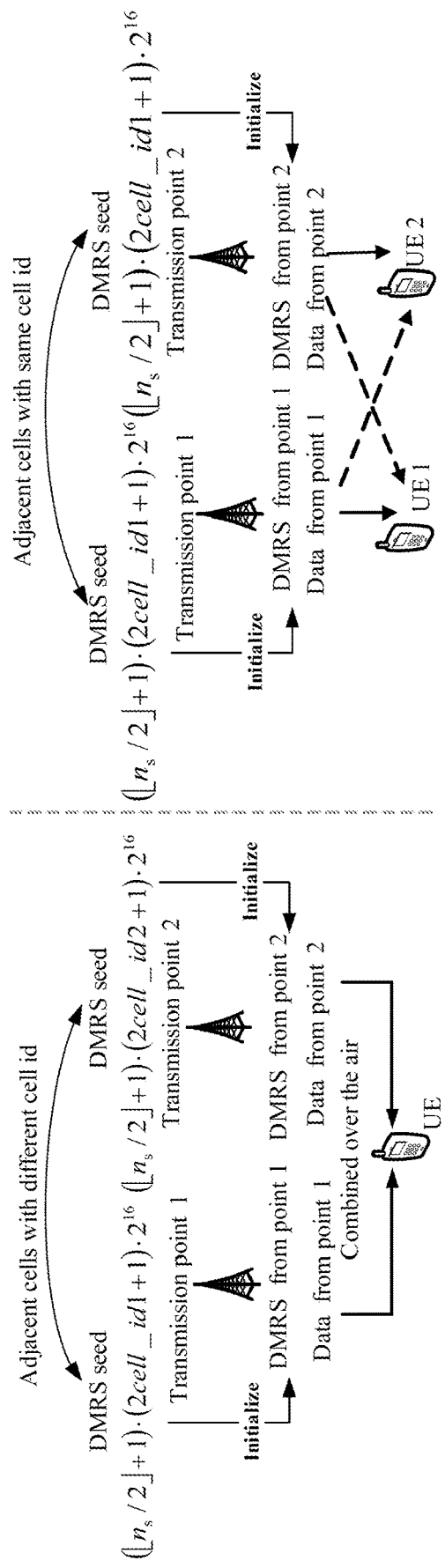
FIG. 4 is a schematic diagram showing a comparison between JT scenario and non-CoMP scenario.

Comparing the equation (2) in the present embodiment with the above equation (1) for generating DMRS random seed in release-10, it is found that the parameter cell_id in the equation (1) is no longer involved in the equation (2). Thus, the conflict requirements on DMRS random seed for the JT scenario and the non-CoMP scenario as shown in FIG. 4 are solved by using the equation (2). Specifically, in the JT scenario, since adjacent transmission points (cells) all use UE specific IDs to generate DMRS random seeds and accordingly the scrambling sequences, they have the same DMRS even in a case of having different transmission point IDs. In the non-CoMP scenario, since different UEs have different UE specific IDs which are used to generate DMRS random seeds and accordingly the scrambling sequences, they have different DMRSs even in a case of having the same transmission point ID, so that overlapped DMRSs on adjacent transmission points will have different scrambling sequences to randomize the potential ICI.

Figure 8:
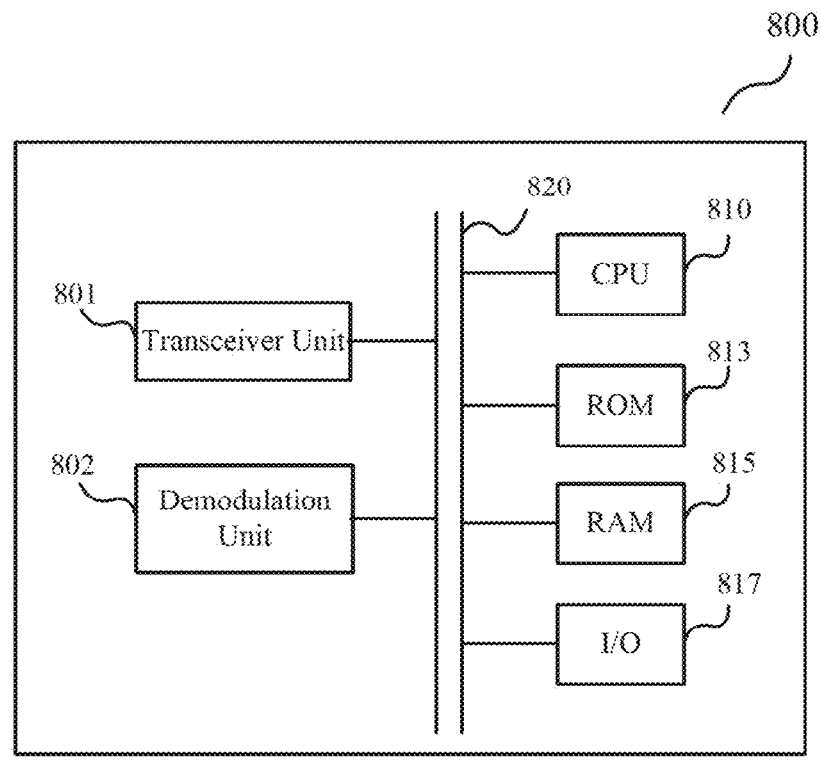
FIG. 8 is a block diagram showing a UE according to the first embodiment of the present disclosure.

FIG. 8 is a block diagram showing a UE according to the first embodiment of the present disclosure. The UE 800 according to the first embodiment of the present disclosure is used for communicating with a transmission point device in a communication system. The UE 800 receives from the transmission point device the RS signals which are assigned on predetermined locations (radio resource, which means the time and/or frequency resource such as sub-carrier, sub-frame, etc.) of at least one layer of resource blocks with the same time and frequency resources. As shown in FIG. 8, the UE 800 may include a transceiver unit 801 and a demodulation unit 802. The transceiver unit 801 receives the resource blocks from the transmission point device. The demodulation unit 802 detects the resource blocks in time domain and/or frequency domain to obtain the RS signals, wherein the signals are scrambled by a scrambling sequence initialized by a random seed generated based on a UE specific ID.

As described previously with reference to the transmission point device 700, a random seed for initializing a scrambling sequence for RS signals such as DMRS may be generated based on a UE specific ID, such as c-RNTI as shown in the equation (2). That is, according to the present embodiment, the random seed may be generated from the equation (2). It should be noted that the equation (2) is only exemplary and the UE specific ID is not limited to c-RNTI, instead, it may be IMSI or other UE specific IDs which are not listed in the present disclosure.

The UE 800 according to the present disclosure may further include a CPU (Central Processing Unit) 810 for executing related programs to process various data and control operations of respective units in the UE 800, a ROM (Read Only Memory) 813 for storing various programs required for performing various process and control by the CPU 810, a RAM (Random Access Memory) 815 for storing intermediate data temporarily produced in the procedure of process and control by the CPU 810, and/or a I/O unit 817 for inputting or outputting various programs, data and so on. The above transceiver unit 801, demodulation unit 802, CPU 810, ROM 813, RAM 815 and/or I/O unit 817 etc. may be interconnected via data and/or command bus 820 and transfer signals between one another.

Respective units as described above do not limit the scope of the present disclosure. According to one embodiment of the disclosure, the function of any of the above transceiver unit 801 and demodulation unit 802 may also be implemented by functional software in combination with the above CPU 810, ROM 813, RAM 815 and/or I/O unit 817 etc.

According to the present embodiment, by generating random seeds for initializing scrambling sequences for the RS signals based on the UE specific IDs, the conflict requirements on DMRS random seed for the JT scenario and the non-CoMP scenario as shown in FIG. 4 are solved, that is, the identical DMRS from multiple transmission points are guaranteed for the JT scenarios while different DMRSs from adjacent transmission points are guaranteed for the non-CoMP scenarios.

Second Embodiment

Comparing the equation (2) brought forward in the first embodiment and the equation (1) for DMRS random seed generation in release-10, it is found that the random seeds generated from the equation (2) may collide with the random seeds generated from the equation (1), because the range of the parameter n_RNTI in the equation (2) is $0 \sim 2^{16}-1$. Considering a case where the random seeds generated from the equation (1) are assigned for release-10 UEs while the random seeds generated from the equation (2) are assigned for release-11 UEs, Such collision may produce problems if release-10 UEs with the random seeds generated from the equation (1) and release-11 UEs with the random seeds generated from the equation (2) coexist.

To resolve the above collision problem, equation (3) gives one exemplary improvement on the equation (2) in the first embodiment as follows $$c_{init}=(\lfloor n_s/2 \rfloor+1) \cdot (2*Max+1) \cdot 2^{16}+(n\_RNTI+2) \quad (3)$$

Where Max=Maxim_value(cell_id), representing the maximum value of transmission point IDs, and parameters $c_{init}$, $n_s$ and n_RNTI are the same as those in the equation (2).

Comparing the equation (3) with the equation (1), it is easy to find that since the parameter Max in the equation (3) corresponds to the maximum value of cell_ids, Max≥cell_id and accordingly 2*Max+1≥2cell_id+1, such that $(\lfloor n_s/2 \rfloor+1) \cdot (2*Max+1) \cdot 2^{16} \geq (\lfloor n_s/2 \rfloor+1) \cdot (2\text{cell\_id}+1) \cdot 2^{16}$. Furthermore, the parameter SCID in the equation (1) is commonly set as 0 or 1, so that SCID<2. Therefore, $(\lfloor n_s/2 \rfloor+1) \cdot (2*Max+1) \cdot 2^{16}+2 > (\lfloor n_s/2 \rfloor+1) \cdot (2\text{cell\_id}+1) \cdot 2^{16}+\text{SCID}$. Thus, it is out of question that the random seeds generated from the equation (3) are always larger than release-10 DMRS random seeds generated from the equation (1). Using the random seed generation equation (3), the above random seed collision problem can be solved. Note that the equation (3) is only one exemplary improvement on the equation (2) and resolution of the above random seed collision problem is not limited thereto. For example, the constant "2" in the equation (3) is a critical value and can be replaced by an arbitrary number larger than 2. Thereby, according to the present embodiment, for a transmission point device (for example, 700) or a UE (for example, 800), the random seed may be generated from the equation (3).

According to the present embodiment, by improving the UE specific random seed generation equation (2) of the second embodiment, collision between the UE specific random seeds and release-10 random seeds can be avoided while the conflict requirements on DMRS random seeds for the JT scenario and the non-COMP scenario as shown in FIG. 4 is solved.

Third Embodiment

Figure 6:
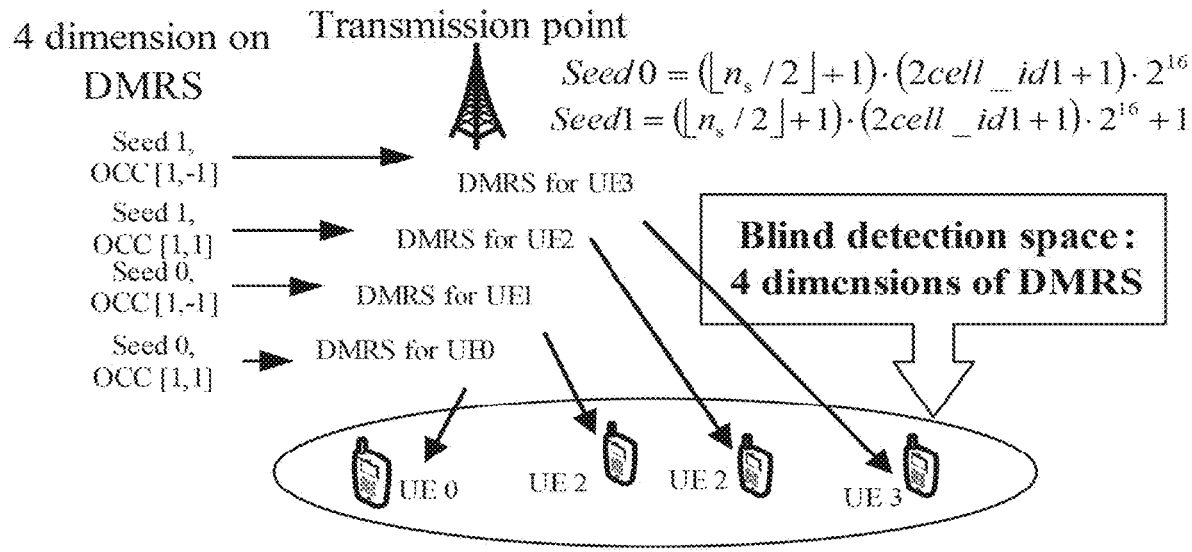
FIG. 6 is a schematic diagram showing an exemplary blind detection.

As described before, the blind detection of DMRS at a receiver side can help an UE to estimate the interference in MU-MIMO operation. However, if the equation (2) or (3) is used to generate DMRS random seeds, the UE may not be able to perform the blind detection, because there are too many possibilities for the UE specific random seeds or the blind detection space is too large in this case. For example, since there are $2^{16}$ possibilities for the value of n_RNTI in both the equation (2) and the equation (3) as discussed above, there are $2^{16}$ possibilities for random seeds generated from the equation (2) or (3), which results in much more dimensions of DMRS than those of FIG. 6 using the release-10 DMRS random seed generation equation (1). It is difficult to perform the blind detection of DMRS in a case of too many dimensions of DMRS.

Figure 5:
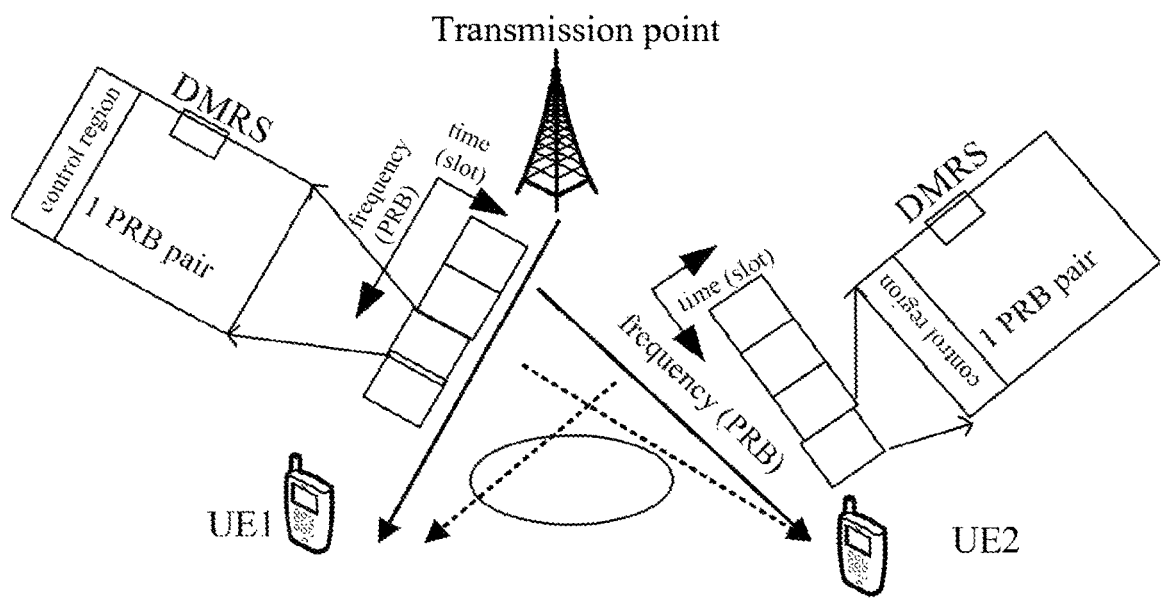
FIG. 5 is a schematic diagram showing an exemplary MU-MEMO scenario.
Figure 9:
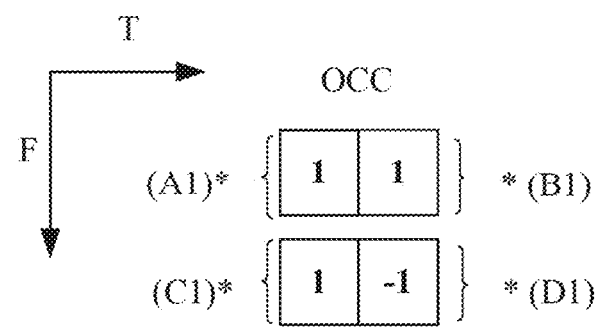
FIG. 9 is a schematic diagram showing an example of MU-MIMO DMRSs multiplexed.

Orthogonality between MU-MIMO DMRS ports is another concern for the equation (2) and the equation (3). As shown in FIG. 5, there are two UEs, i.e. UE1 and UE2, in the MU-MIMO case. It is assumed that UE1 is assigned with DMRS port 7 (OCC [1,1]) and UE2 is assigned with DMRS port 8 (OCC [1,−1]) and that UE1 and UE2 are both configured with UE specific random seeds generated from the equation (2) or (3). Therefore, it is found that two different sequences are scrambled to the two orthogonal DMRS ports (the ports 7 and 8) respectively as illustrated in FIG. 9. FIG. 9 is a schematic diagram showing an example of MU-MIMO DMRSs multiplexed. In FIG. 9, the port 7 corresponding to OCC [1, 1] is scrambled by the scrambling sequence [A1, B1 . . . ] while the port 8 corresponding to OCC [1, −1] is scrambled by the scrambling sequence [C1, D1 . . . ]. The two scrambling sequences are initialized respectively by two different random seeds generated from the above equation (2) or (3) based on their respective UE specific IDs. Here, if $(A1^*)C1+(B1^*)D1=0$ or $[A1,B1] \perp [C1,D1]$, the orthogonality between the two DMRS ports is destroyed. Therefore, in such a MU-MIMO case, to keep the DMRS orthogonality between MU UEs, it is necessary to use the same scrambling sequence for two MU UEs if they are assigned with orthogonal DMRS ports (for example, the port 7 and the port 8).

Considering that the release-10 DMRS random seed design enables blind detection as discussed above with reference to FIG. 5 and FIG. 6, the basic idea of the present embodiment is to switch between the release-10 DMRS random seeds as generated from the equation (1) and the UE specific DMRS random seeds as generated from the equation (3) in order to resolve the above two problems encountered in a case of generating DMRS random seeds based on UE specific IDs. Specifically, when UEs are in MU-MIMO operation, the system configures the UEs with the release-10 DMRS random seeds as generated from the release-10 random seed generation equation (1); otherwise, the UEs are configured with the UE specific random seeds as generated from the equation (3).

The advantage of such a switch is that: when the UEs are in MU operation, the release-10 random seeds can enable the blind detection and keep the orthogonality between them; when the UEs are not in MU operation, the UE specific random seeds can satisfy the conflict requirements for both JT and non-COMP operations.

FIG. 10 is a block diagram showing a transmission point device according to the third embodiment of the present disclosure. The transmission point device 1000 according to the third embodiment of the present disclosure is used for communicating with a UE in a communication system. Similarly to the transmission point device 700 of the first embodiment, the transmission point device 1000 transmits, to a UE, RS signals which are assigned on predetermined locations (radio resource, which means the time and/or frequency resource such as sub-carrier, sub-frame, etc.) of at least one layer of resource blocks with the same time and frequency resources. As shown in FIG. 10, the transmission point device 1000 may include a selection unit 1001, an initialization unit 1002, a scrambling unit 1003, and a transceiver unit 1004. The selection unit 1001 selects a random seed from a first random seed generated based on a transmission point ID and a second random seed generated based on a UE specific ID. The initialization unit 1002 initializes a scrambling sequence by the random seed selected in the selection unit 1001. The scrambling unit 1003 scrambles the signals with the scrambling sequence initialized in the initialization unit 1002. The transceiver unit 1004 transmits the resource block with the signals scrambled in the scrambling unit 1003 to the UE. It should be noted that the RS signals here can be any kinds of RS signals such as DMRS and the like.

The transmission point device 1000 according to the present disclosure may further include a CPU 1010, a ROM 1013, a RAM 1015 and/or I/O unit 1017, all of which are the same as those in the transmission point device 700 of the first embodiment. For the sake of simplicity, the description of their functions is omitted here. Also, the above selection unit 1001, initialization unit 1002, scrambling unit 1003, transceiver unit 1004, CPU 1010, ROM 1013, RAM 1015 and/or I/O unit 1017 etc. may be interconnected via data and/or command bus 1020 and transfer signals between one another.

Respective units as described above do not limit the scope of the present disclosure. According to one embodiment of the disclosure, the function of any of the above selection unit 1001, initialization unit 1002, scrambling unit 1003 and transceiver unit 1004 may also be implemented by functional software in combination with the above CPU 1010, ROM 1013, RAM 1015 and/or I/O unit 1017 etc.

According to the present embodiment, the UE shown in FIG. 8 may also receive from the transmission point device 1000 the resource blocks, and obtain the signals which are scrambled by a scrambling sequence initialized by a random seed selected from a first random seed generated based on a transmission point ID and a second random seed generated based on a UE specific ID.

To implement the switch between the release-10 DMRS random seeds and the UE specific DMRS random seeds, there should be a signaling to notify the UEs about the switch. One simple way is to add one bit signaling flag in current PHY (physical) signaling for the switch. It should be noted that a way of notifying the UEs of the switch is not limited to the way as described above.

According to the present embodiment, although not shown in FIG. 10, the transmission point device 1000 may also include a notification unit which notifies the user equipment of the switch between (selection of) the first random seed and the second random seed by adding one bit signaling as a switch flag. The first random seed may be generated from the equation (1). The second random seed is different from the first random seed. The second random seed may be generated from the equation (3).

According to the present embodiment, although not shown in FIG. 8, the transceiver unit 802 in the user equipment 800 may also receive a message which indicates the selection of the first random seed and the second random seed with one bit signaling as a switch flag, in which the first random seed may be generated from the equation (1), the second random seed is different from the first random seed, and the second random seed may be generated from the equation (3).

According to the present embodiment, by switching between the release-10 DMRS random seeds and the UE specific DMRS random seeds, the blind detection can be enabled and the orthogonality between the UEs can be kept in MU operation, while the conflict requirements for both JT and non-CoMP operations can be solved in non-MU operation.

The following description will focus on how to notify the UEs of the selection of the release-10 DMRS random seeds and the UE specific DMRS random seeds.

FIG. 11 shows a table for notifying the UEs of DMRS ports and DMRS random seeds in the release-10 as defined in TS 36.212. As shown in FIG. 11, the table is divided into two parts, and the left part corresponds to one codeword case while the right part corresponds to a case of two codewords. In the left part (the one codeword case), the left column gives eight values 0-7 in the one codeword and the right column represents messages indicated by the values. Except that the value 7 is reserved, the other seven values 0-6 indicate different combinations of DMRS ports and DMRS random seeds respectively. Specifically, the value 0 indicates a case of one layer transmission with the port 7 and SCID=0; value 1 indicates a case of one layer transmission with the port 7 and SCID=1; the value 2 indicates a case of one layer transmission with the port 8 and SCID=0; value 3 indicates a case of one layer transmission with the port 8 and SCID=1; the value 4 indicates a case of two layer transmission with the ports 7-8 and SCID=0; the value 5 indicates a case of three layer transmission with the ports 7-9 and SCID=0; and the value 6 indicates a case of four layer transmission with the ports 7-10 and SCID=0.

The right part (the case of two codewords) of the table in FIG. 11 is similar with the left part. That is, eight values 0-7 in the two codeword indicate respectively eight different combinations of DMRS ports and DMRS random seeds respectively. Specifically, the value 0 indicates a case of two layer transmission with the ports 7-8 and SCID=0; value 1 indicates a case of two layer transmission with the ports 7-8 and SCID=1; the value 2 indicates a case of three layer transmission with the ports 7-9 and SCID=0; value 3 indicates a case of four layer transmission with the ports 7-10 and SCID=0; the value 4 indicates a case of five layer transmission with the ports 7-11 and SCID=0; the value 5 indicates a case of six layer transmission with the ports 7-12 and SCID=0; the value 6 indicates a case of seven layer transmission with the ports 7-13 and SCID=0; and the value 7 indicates a case of eight layer transmission with the ports 7-14 and SCID=0.

On PHY signaling, different values are transmitted on the air interface. A UE receives different values and interprets the meanings of the values according to the table of FIG. 11.

From FIG. 11, it is found that SCID equals 0 in most of the cases, that is, the cases of the values 0, 2 and 4-6 in the left part corresponding to the one codeword and the cases of the values 0 and 2-7 in the right part corresponding to the two codewords, which gives a hint that the SCID may be used as an implicit signaling to notify the UEs of the random seed selection. FIG. 12 shows a table for notifying the UEs of the selection of the release-10 random seeds and the UE specific random seeds according to the present embodiment. In FIG. 12, 8 values are used to indicate release-11 messages in both cases of one codeword and two codewords.

By comparing the table of FIG. 12 and the table of FIG. 11, it is found that "SCID=0" in FIG. 11 is replaced by "UE specific seed" (UE specific random seed) in release-11 message in FIG. 12, and "SCID=1" in FIG. 11 is replaced by "rel-10 seed (SCID=0)" (release-10 random seed) in FIG. 12. Here, "rel-10 seed (SCID=0)" represents the following equation (4) which is obtained from the equation (1) with SCID being set as 0.

$$c_{init} = (\lfloor n_s/2 \rfloor + 1) \cdot (2N_{ID}^{cell} + 1) \cdot 2^{16} \qquad (4)$$

Wherein, the parameter $N_{ID}^{cell}$ is equivalent to the parameter cell_id in the equation (1), representing the value of a transmission point ID. "UE specific seed" in FIG. 12 means random seeds generated from the equation (3) based on the UE specific IDs. The table shown in FIG. 12 uses "SCID" in the table of FIG. 11 as an implicit signaling to notify the UEs of the selection of the release-10 random seeds and the UE specific random seeds. That is, when SCID in FIG. 11 is 0, it indicates to the selection of the UE specific random seed; when SCID in FIG. 11 is 1, it indicates the selection of the release-10 random seed as generated from the equation (4).

Therefore, according to the present embodiment, by using SCID as a switch flag, the UEs can be notified of the switch between (selection of) the release-10 random seeds and the UE specific random seeds through the current PHY signaling without adding one bit signaling flag.

It should be noted that the table shown in FIG. 12 is only one example. It is easy to see that if the relationship between the "value" and the "message" in the table of FIG. 12 is re-ordered, it has the same effects as before. But after re-ordering, the "SCID" cannot be interpreted as a switch flag.

It should be noted that the release-10 DMRS random seed has two possibilities, that is, SCID=0 (the equation (4)) and SCID=1. However, in the table in FIG. 12, when it is switched to the release-10 DMRS random seed (rel-10 seed), only the SCID=0 case is retained. It is found with reference to FIG. 6 that if the blind detection is enabled in this case, combinations of only SCID=0 case and two OCCs ([1, 1]

and [1, −1]) result in only two dimensions of the blind detection. However, the release-10 supports four dimensions of the blind detection in fact.

In the present embodiment, in order to overcome the above constraint on the dimensions of the blind detection in the table of FIG. 12, the table defined in TS 36.212 (the table of FIG. 11) may be modified instead of introducing a new bit of switch flag to notify the UE of the RS random seed switching.

The present embodiment starts from analysis of the table in FIG. 12. First, it is found that the value 7 in one codeword case is a reserved value. Second, it is found that port 7 (OCC [1,1]) and port 8 (OCC [1,−1]) can both support the UE specific random seeds. Furthermore, for non-MU operation (including JT operation and non-COMP operation), the use of UE specific random seeds is enough as described in the first and the second embodiments; for MU operation, DMRS random seed is switched to the release-10 random seed case. Therefore, it can be concluded that one of ports 7 and 8 is configured with the UE specific random seed is enough.

Based on the above analysis, the basic idea of the present embodiment is: 1) DMRS random seeds for one layer transmission is the same as those in the release-10 for the MU scenario; 2) the reserved value 7 in the table for current signaling in FIG. 11 is utilized; 3) one of port 7 or port 8 (instead of both port 7 and port 8) is configured with the UE specific random seed for the non-MU scenario. FIG. 13 shows another table for notifying the UEs of the switch between (selection of) the release-10 random seeds and the UE specific random seeds according to the present embodiment. The table shown in FIG. 13 is an improvement of the table shown in FIG. 12. Since only the left part (the one codeword case) of the table in FIG. 12 is modified in the present embodiment while the right part (the case of two codewords) remains unchanged, for sake of clarity, only the modified left part is shown in FIG. 13.

In FIG. 13, for MU operation, the release-10 random seeds are normal release-10 random seeds as generated from the equation (1). That is, the messages corresponding to values 0-3 are the same as those in the table of FIG. 11. Thereby, four dimensions of blind detection are assured. The messages corresponding to values 4-6 in FIG. 13 are the same as those in the table of FIG. 12, wherein the UE specific random seed is the random seed generated from the equation (3). The value 7 which is reserved in FIG. 11 and FIG. 12 indicates the case of one layer transmission with port 7 and the UE specific seed in FIG. 12. It is seen that because of using the reserved value and configuring just one port (for example, port 7) with the UE specific random seed for rank 1 transmission, it is possible to retain the normal release-10 random seeds in the table shown in FIG. 13. Here, it is noted that the value 7 may indicate the case of one layer transmission with port 8 and the UE specific seed, alternatively.

According to the present embodiment, the MU blind detection space is the same as that in release-10 while there is no need to introduce a new signaling bit to notify the UEs of the DMRS random seed switch.

It is noted that the table of FIG. 13 is only one example, and re-ordering the relationship between the "value" and the "message" in the table has the same effects as described above. Furthermore, it will be appreciated by those skilled in the art that it is also possible to retain only one value of "0" or "2" in the table of FIG. 12 in the sense that configuring one port (port 7 or 8) with the UE specific random seed for rank 1 transmission of the MU scenario is sufficient. Specifically, if value 0 is retained, value 1-3 and 7 may be used to indicate respectively four combinations of different ports and different release-10 random seeds with respect to one layer transmission. Similarly, if value 2 is retained, value 0, 1, 3 and 7 may be used to indicate respectively four combinations of different ports and different release-10 random seeds with respect to one layer transmission.

The aforesaid examples all focus on downlink DMRS cases. In fact, similar problem also occurs on uplink DMRS cases. For example, in UL (uplink) DMRS of PUSCH (Physical Uplink Shared Channel) case, the scrambling sequences are initialized by random seeds based on transmission point IDs. If adjacent transmission points have the same transmission point ID, DMRSs of PUSCH among adjacent transmission points may interfere with each other. In that case, using UE specific random seeds which are based on the UE specific IDs such as n_RNTI is better than using transmission point specific random seeds which are based on for example transmission point IDs.

According to the present embodiment, uplink RS signals may be scrambled by a scrambling sequence initialized by a random seed generated based on a UE specific ID.

According to the present embodiment, uplink RS signals may also be scrambled by a scrambling sequence initialized by a random seed which is selected from a first random seed generated based on a transmission point specific ID and a second random generated based on a UE specific ID.

The above description all focus on the RS (for example, DMRS) design. In fact, scrambling is also applied to data channels, such as PDSCH (Physical Downlink Shared Channel) or PUSCH, and control channels, such as PDCCH (Physical Downlink Control Channel) or PUCCH (Physical Uplink Control Channel). A scrambling sequence initialized by a random seed is scrambled to a data or control channel to randomize the potential ICI among cells or transmission points. Transmission point IDs are also involved in the random seed generation. Therefore, if adjacent cells or transmission points have different transmission point IDs, the JT operation will encounter problems as described before. In this case, using the UE specific random seeds which is based on the UE specific IDs to initialize the scrambling sequences is also the solution.

According to the present embodiment, for a transmission point device (for example, 700, 1000) or a UE (for example, 800), the signals may be one of RSs, control signals for control channels, and data signals for data channels. That is, according to the present embodiment, signals, either control signals for control channels or data signals for data channels, may be scrambled by a scrambling sequence initialized by a random seed generated based on a UE specific ID, or according to the present embodiment, signals, either control signals for control channels or data signals for data channels, may also be scrambled by a scrambling sequence initialized by a random seed which is selected from a first random seed generated based on a transmission point specific ID and a second random generated based on a UE specific ID.

In LTE (release-8, 9) and LTE-A (release-10), the downlink control channel (PDCCH) is based on CRS (Control Reference Signal) which is used as the RS for demodulation, and CRS is transmission point specific without precoding. However, for release-11 or latter release, it is likely that the PDCCH is enhanced to E-PDCCH (Enhanced PDCCH) by utilizing DMRS as the reference signal to demodulate. In this case, the idea as described above can also be applied to DMRS based E-PDCCH: 1) DMRS random seed can be generated based on a UE specific ID; 2) The DMRS random seed can be switched between a UE specific random seed and a transmission point specific random seed (such as release-10 random seed).

In addition to the reasons mentioned before, there is another advantage of generating a random seed for DMRS of E-PDCCH based on a UE specific ID: when a UE detects E-PDCCH, the UE is unaware of the potential DMRS configurations because E-PDCCH is a control channel. Thus, if E-PDCCH uses the release-10 DMRS random seed, the UE needs at least to "guess" whether it uses SCID=0 or 1. However, if E-PDCCH uses a UE specific DMRS random seed, the UE knows the DMRS random seed on detecting the E-PDCCH since the UE specific ID such as c-RNTI has already been assigned to the UE at this stage.

Fourth Embodiment

The first to third embodiments as described above all use a random seed generated based on a UE specific ID to initialize the scrambling sequence for scrambling signals. However, it is noted that the ID on which a random seed is generated is not limited to the UE specific ID. It is also possible to generate the random seed based on a group ID which can also be referred to as a common ID. The group ID means that a group of UEs can share one ID, which is different from the case of using a UE specific ID as a random seed. As an example, equation (5) is used for generating the random seed for initializing a scrambling sequence for signals based on a group ID as follows.

$$c_{init}=(\lfloor n_s/2 \rfloor+1)\cdot(2\text{group\_}id+1)\cdot 2^{16} \quad (5)$$

Wherein, $c_{init}$ represents the random seed, $n_s$ represents the slot number, and group_id represents the group ID.

Comparing the equation (5) with the equation (1), it is found that the difference between two equations is that the cell_id in the equation (1) is replaced by the group_id in the equation (5) and the SCID is not involved in the equation (5). For the equation (1), a UE knows the cell_id through a transmission point specific way, i.e., a broadcasting channel. Similarly, for the equation (5), the group_id can be assigned by a transmission point device and notified to the UE by a UE specific signaling.

By using the group_id, the random seed requirements including the same random seed in JT operation and different random seeds in non-CoMP operation, as shown in FIG. 4, can be satisfied through the transmission points assigning the same or different group_id to the UE(s) respectively.

However, in the MU operation, it is likely that a release-11 UE and a release-10 UE may coexist. In this case, if the release-11 UE uses the random seed generated by the equation (5), then the release-10 UE cannot take blind detection for MU interference of release-11 UEs. To solve this problem, the idea of the third embodiment as described above can also be used in the present embodiment. That is, for the MU operation, release-10 random seeds as generated by the equation (1) based on transmission point IDs are used to initialize the scrambling sequences for scrambling signals. In other cases such as JT operation and non-COMP operation, random seeds generated by the equation (5) are used.

According to the present embodiment, a transmission point device (for example, 1000) may further include a notification unit which notifies the group ID to the UE by UE specific signaling. The second random seed is generated from the equation (5) including the group ID.

According to the present embodiment, in a UE (for example, 800), the transceiver unit may further receive UE specific signaling which indicates the group ID from a transmission point. The second random seed is generated from the equation (5) including the group ID.

Fifth Embodiment

Figure 14:
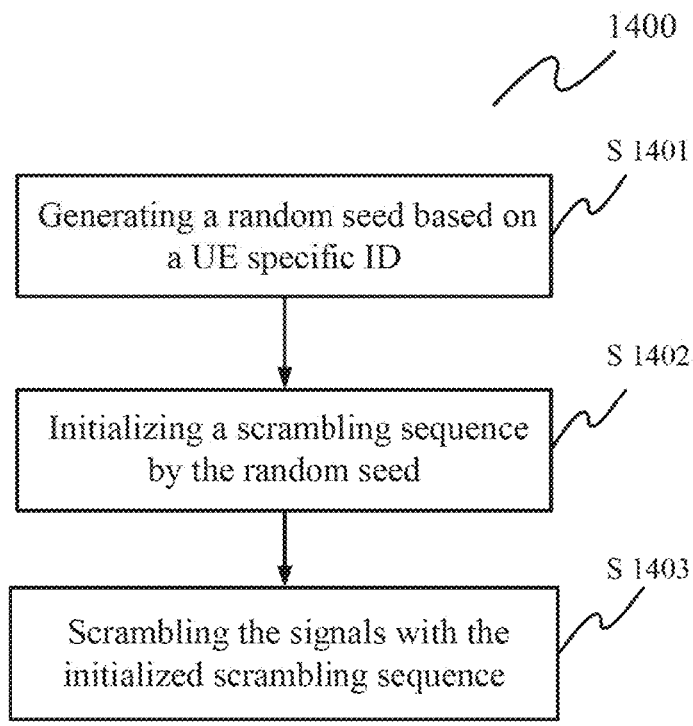
FIG. 14 is a diagram showing a flow chart of a method of scrambling signals according to the fifth embodiment of the present disclosure.

FIG. 14 is a diagram showing a flow chart of a method of scrambling signals according to the fifth embodiment of the present disclosure.

As shown in FIG. 14, the method 1400 according to the fifth embodiment of the present disclosure is used for scrambling signals assigned on predetermined radio resources of at least one layer of resource blocks with the same time and frequency resources. In the step S1401, a random seed is generated based on a UE specific ID. In the step S1402, a scrambling sequence is initialized by the random seed. In the step S1403, the signals are scrambled with the initialized scrambling sequence.

According to the present embodiment, the above step S1401 can be executed by the random seed generation unit 701, the above step S1402 can be executed by the initiation unit 702, and the above step S1403 can be executed by the scrambling unit 703.

According to the present embodiment, the user equipment specific ID may be a global user equipment specific identification number.

According to the present embodiment, the user equipment specific ID may be International Mobile Subscriber Identification Number.

According to the present embodiment, the user equipment specific ID may be a user equipment specific ID assigned to a user equipment when the user equipment accesses to a LTE network.

According to the present embodiment, the user equipment specific ID may be c-RNTI.

According to the present embodiment, although not shown in FIG. 14, the method 1400 may further include a step of generating the random seed based on the equation (2).

According to the present embodiment, although not shown in FIG. 14, the method 1400 may further include a step of generating the random seed based on the equation (3).

According to the present embodiment, the signals may be one of reference signals, control signals for control channels, and data signals for data channels.

According to the present embodiment, the signals may be Demodulation Reference Signals.

According to the present embodiment, although not shown in FIG. 14, the method 1400 may further include a step of transmitting the resource blocks with the scrambled signals from a transmission point to a user equipment or from the user equipment to the transmission point. This step may be executed by the transceiver unit 704 of the transmission point device 700 and the transceiver unit 801 of the UE 800.

According to the present embodiment, by generating random seeds for initializing the scrambling sequences for signals based on the UE specific IDs, the conflict requirements on random seeds for the JT scenario and the non-CoMP scenario are solved.

Sixth Embodiment

Figure 15:
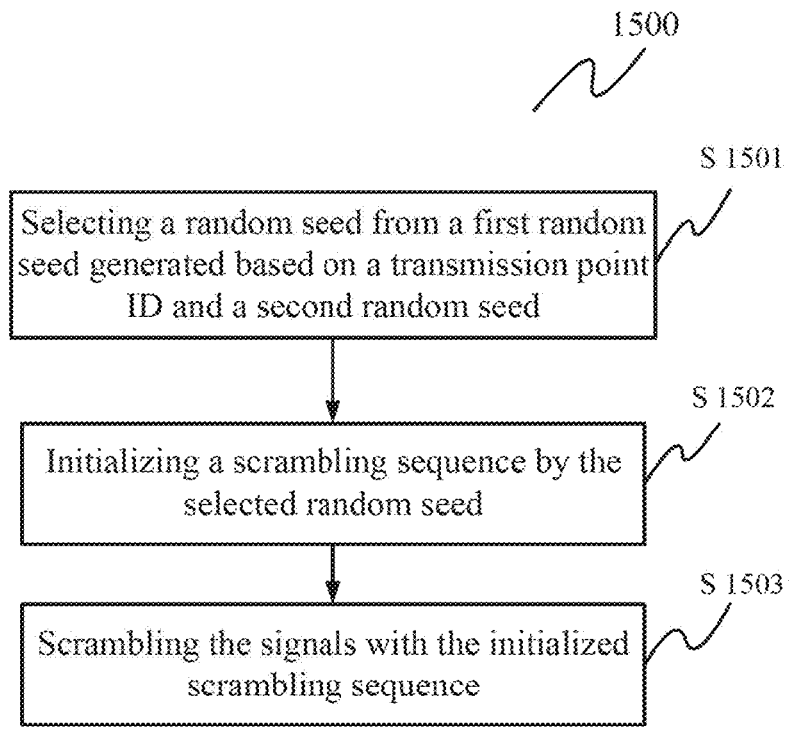
FIG. 15 is a diagram showing a flow chart of a method of scrambling signals according to the sixth embodiment of the present disclosure.

FIG. 15 is a diagram showing a flow chart of a method of scrambling signals according to the sixth embodiment of the present disclosure.

As shown in FIG. 15, the method 1500 according to the present embodiment is used for scrambling signals assigned on predetermined radio resources of at least one layer of resource blocks with the same time and frequency resources. In the step S1501, a random seed is selected from a first random seed generated based on a transmission point ID and a second random seed. In the step S1502, a scrambling sequence is initialized by the selected random seed. In the step S1503, the signals are scrambled with the initialized scrambling sequence.

According to the present embodiment, the above step S1501 can be executed by the selection unit 1001, the above step S1502 can be executed by the initiation unit 1002, and the above step S1503 can be executed by the scrambling unit 1003.

According to the present embodiment, the second random seed may be generated based on a group ID assigned by a transmission point.

According to the present embodiment, although not shown in FIG. 15, the method 1500 may further include a step of notifying the group ID to a user equipment by user equipment specific signaling. This step may be executed by a notification unit (not shown in FIG. 10) of the transmission point device 1000.

According to the present embodiment, the second random seed may be generated from the equation (5).

According to the present embodiment, the second random seed may be generated based on a user equipment specific ID.

According to the present embodiment, the method 1500 may further include a step of notifying a receiver side of the selection of the first random seed and the second random seed by adding one bit signaling as a switch flag. This step may be executed by a notification unit (not shown in FIG. 10) of the transmission point device 1000.

According to the present embodiment, the method 1500 may further include a step of notifying a receiver side of the selection of the first random seed and the second random seed by using signaling set with one codeword, wherein, seven values in the one codeword respectively indicate the following seven cases: one layer of signals configured with a first port and the second random seed; one layer of signals configured with the first port and the first random seed; one layer of signals configured with a second port and the second random seed; one layer of signals configured with the second port and the first random seed; two layers of signals configured with the first and the second ports and the second random seed; three layers of signals configured with the first, the second and a third ports and the second random seed; and four layers of signals configured with the first to the third ports and a fourth port and the second random seed. This step may be executed by a notification unit (not shown in FIG. 10) of the transmission point device 1000.

According to the present embodiment, the method 1500 may further include a step of notifying a receiver side of the selection of the first random seed and the second random seed by using signaling set with two codewords, wherein, eight values in the two codewords respectively indicate the following eight cases: two layers of signals configured with the first and the second ports and the second random seed; two layers of signals configured with the first and the second ports and the first random seed; three layers of signals configured with the first, the second and the third ports and the second random seed; and four layers of signals configured with the first to the fourth ports and the second random seed; five layers of signals configured with the first to the fourth ports and a fifth port and the second random seed; six layers of signals configured with the first to the fifth ports and a sixth port and the second random seed; seven layers of signals configured with the first to the sixth ports and a seventh port and the second random seed; and eight layers of signals configured with the first to the seventh ports and a eighth port and the second random seed. This step may be executed by a notification unit (not shown in FIG. 10) of the transmission point device 1000.

According to the present embodiment, the first random seed is generated from the equation (1).

According to the present embodiment, the method 1500 may further include a step of notifying a receiver side of the selection of the first random seed and the second random seed by using signaling set with one codeword, wherein, eight values in the one codeword respectively indicate the following eight cases: one layer of signals configured with a first port and the first random seed with SCID=0; one layer of signals configured with the first port and the first random seed with SCID=1; one layer of signals configured with a second port and the first random seed with SCID=0; one layer of signals configured with the second port and the first random seed with SCID=1; two layers of signals configured with the first and the second ports and the second random seed; three layers of signals configured with the first, the second and a third ports and the second random seed; four layers of signals configured with the first to the third ports and a fourth port and the second random seed; and one layer of signals configured with the first port or the second port and the second random seed. This step may be executed by a notification unit (not shown in FIG. 10) of the transmission point device 1000.

According to the present embodiment, the second random seed is different from the first random seed.

According to the present embodiment, the second random seed is generated from the equation (3).

According to the present embodiment, the signals are one of reference signals, control signals for control channels, and data signals for data channels.

According to the present embodiment, the method 1500 may further include a step of transmitting the resource blocks with the scrambled signals from a transmission point to a user equipment or from the user equipment to the transmission point. This step may be executed by the transceiver unit 1004 of the transmission point device 1000 and the transceiver unit 801 of the UE 800.

According to the present embodiment, by switching between transmission point specific random seeds and UE specific random seeds or random seeds generated based on group IDs assigned by transmission points, the blind detection can be enabled and the orthogonality between UEs can be kept in MU operation, while the conflict requirements for both JT and non-CoMP operations can be solved in non-MU operation.

Seventh Embodiment

As described above in the fourth embodiment, by using a group ID to generate a random seed, the random seed requirements in JT operation and in non-CoMP operation, as shown in FIG. 4, can also be satisfied. However, with being different from using a UE specific ID to generate the DMRS seed (in that case, the UE specific ID is already known to UE), a group ID needs to be notified to a UE side in a case of using the group ID to generate a DMRS seed. The present embodiment will focus on how to notify a group ID to a UE.

Two issues need to be decided when a group ID is used to generate a DMRS random seed:

1) How many group IDs are necessary to facilitate different scenarios (CoMP, non-CoMP, MU scenarios) as described in the BACKGROUND part, and 2) How to notify UE which group ID is to be used, i.e. by higher layer signaling or by physical layer signaling.

For the question 1), cases for different scenarios are different. Specifically, if group IDs are used in CoMP or non-CoMP scenarios, then a large range of group IDs may be helpful to avoid ICI due to DMRS. On the other hand, if group IDs are used in a MU operation, then a small range of group IDs may benefit MU blind detection.

For the question 2), the solution also depends on the scenario where group IDs are used. Specifically, if a UE is on the boundary of a transmission point (cell) and fast switches between CoMP and non-COMP states, fast configuration of the group IDs is necessary (higher layer signaling cannot track such switch), then physical layer signaling is necessary. Similar things also hold when a UE is in the center of a transmission point (cell) and fast switches between MU & non-MU states. However, if a UE moves from the center to the edge of a transmission point (cell) and needs to reconfigure the DMRS random seed, then higher layer signaling is enough.

Therefore it is seen that depending on specific cases where group IDs are used, a large or small range of group IDs and higher layer signaling or physical layer signaling can both satisfy some kinds of scenarios. If a large range of group IDs and physical layer signaling are always used, it means a great waste. So how to choose a proper range of group IDs and the way to configure them to a UE is a critical issue.

In this embodiment, it is proposed to combine higher layer signaling and physical layer signaling to solve this problem. A proposed method for configuring (sending) a group ID to a UE consists of 2 steps:

1) A group ID table is configured (sent) to a UE through higher layer signaling. Wherein, this table contains available group IDs that the UE can use. The whole range of group IDs may be large, but a network side can configure and send a subset of the whole group ID space to a UE.

2) After the group ID table is configured (sent) to the UE, physical layer signaling is used to notify the UE which group ID in the group ID table is to be used.

Figure 16:
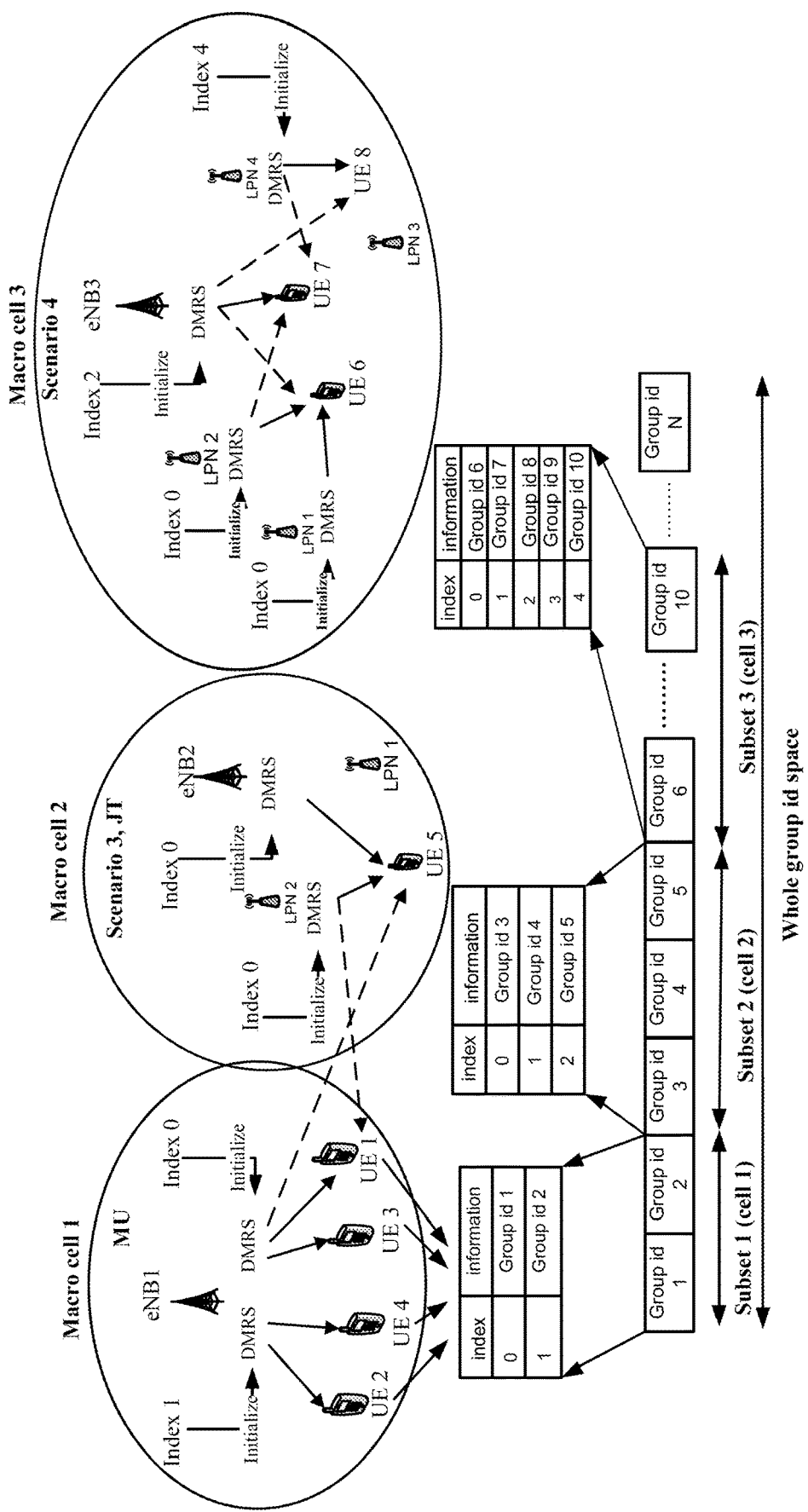
FIG. 16 is a schematic diagram showing the configuration of group IDs according to the seventh embodiment of the present disclosure.

The basic idea of this embodiment is illustrated in FIG. 16. FIG. 16 is a schematic diagram showing the configuration of group IDs according to the present embodiment. In FIG. 16, three macro cells (macro transmission point) 1-3 are shown. In the macro cell 1, MU operation is performed and there are eNB1 and four UEs 1-4. In the macro cell 2, JT (CoMP) operation is performed and there are eNB2, two LPNs (Lower Power Nodes) 1-2 and UE 5, wherein the eNB2, LPN 1, and LPN 2 all have different transmission point (cell) IDs respectively. In the macro cell 3, non-CoMP operation is performed and there are eNB3, four LPNs 1-4 and three UEs 6-8, wherein the eNB3, LPN 1, LPN 2, LPN 3, LPN 4 all have the same transmission point (cell) ID. Here, an eNB or a LPN may also be referred to as a transmission point (device).

For these three macro cells performing three different kinds of operations, the network side configures (sends) different group ID tables to UEs in different macro cells through higher layer signaling respectively. Each group ID table contains two parts, i.e., "index" and "information" which respectively indicate indexes and the corresponding group IDs which are available to UEs, as shown in FIG. 16.

Specifically, as shown in FIG. 16, the UEs 1-4 in the macro cell 1 are configured with the group ID table on the left side of the figure in which two indexes 0, 1 and their corresponding group IDs, i.e. group ID 1 and group ID 2 are contained. As described above with reference to FIG. 6, two random seeds for UEs 1-4 in MU operation can satisfy the requirement of MU blind detection, thus two available group IDs are enough for the macro cell 1.

For the macro cell 2, since the eNB2, LPN 1, LPN 2 have different transmission point (cell) IDs respectively, different DMRS random seeds generated based on their different transmission point IDs cannot meet the random seed requirement for JT operation as described in the BACKGROUND part. Accordingly, group ID is used here to generate DMRS random seed so as to meet the requirement. Specifically, UE 5 is configured with the group ID table in the middle of the figure in which three indexes 0, 1, 2 and their corresponding group IDs, i.e. group ID 3, group ID 4 and group ID 5 are contained. It is noted here that three available group IDs are provided since three transmission points, that is, eNB2 and LPNs 1-2, exist in the macro cell 2.

For the macro cell 3, since the eNB3, LPN 1, LPN 2, LPN 3, LPN 4 all have the same transmission point (cell) ID, the same DMRS random seed generated based on their same transmission point ID cannot meet the random seed requirement for non-CoMP operation as described in the BACKGROUND part. Accordingly, group ID is used here to generate DMRS random seed so as to meet the requirement. Specifically, UEs 6-8 are configured with the group ID table on the right side of the figure in which five indexes 0-4 and their corresponding group IDs 6-10 are contained. Here, five available group IDs are provided since five transmission points, that is, eNB3 and LPNs 1-4, exist in the macro cell 3.

As described above, a group ID table configured to a UE may contain the maximum number of group IDs to be possibly used by the UE and it is a subset of the whole group ID space. As shown in FIG. 16, the whole group ID space may contain a large number of group IDs, for example, from group ID 1 to group ID N. However, the number of group IDs in the group ID table configured to a UE is limited. Thus, only a small range of indexes is enough for each UE.

When a UE is configured with a group ID table through higher layer signaling from the network side, an transmission point device (eNB) uses physical layer signaling to notify the UE which group ID is to be used in the group ID table or to notify the UE the used "index" in the group ID table. Specifically, for the macro cell 1, for example, by notification of eNB1, DMRSs for UE 1 and UE 3 are scrambled with a scrambling sequence which is initiated by a random seed generated based on the index 0, i.e. group ID 1, and DMRSs for UE 2 and UE 4 are scrambled with a scrambling sequence which is initiated by a random seed generated based on the index 1, i.e. group ID 2.

For the macro cell 2, although the group ID table configured to UE 5 contains three available group IDs 3-5, in fact, the three available group IDs may not be used entirely. For example, for JT operation of different transmission points, the same random seed is generated based on one of available group IDs in the configured group ID table as described above with reference to FIG. 4. Therefore, for example, as shown in FIG. 16, through physical layer signaling from eNB2 and LPN2, UE 5 is notified that the same random seed for both eNB 2 and LPN 2 is generated based on index 0, i.e. group ID 3.

The macro cell 3 is discussed now. As described with reference to FIG. 4, for non-CoMP operation of adjacent transmission points, different DMRS random seeds generated based on different group IDs is required for avoiding ICI due to DMRS. Thus, as shown in FIG. 16, for the operation of two adjacent interfering transmission points eNB3 and LPN 2 which respectively transmit signals to UE 7 and UE 6, UE 7 is notified through physical layer signaling from eNB3 that the random seed for eNB3 is generated based on index 2, i.e. group ID 8 while UE 6 is notified through physical layer signaling from LPN 2 that the random seed for LPN 2 is generated based on index 0, i.e. group ID 6. Similarly, for the operation of two adjacent interfering transmission points eNB3 and LPN 4 which respectively transmit signals to UE 7 and UE 8, UE 8 is further notified through physical layer signaling from LPN 4 that the random seed for LPN 4 is generated based on index 4, i.e. group ID 10.

Note that, there is a possibility that different kinds of operations exist at the same time in a macro cell. For example, as shown in the macro cell 3 of FIG. 16, two transmission points LPN 2 and LPN 1 transmit signals to the same UE, i.e. UE 6, which is a case of JT operation. Thus, the DMRS for LPN 1 should be the same as that for LPN 2 and accordingly UE 6 is notified through physical layer signaling from LPN 1 that the random seed for LPN 1 is generated based on index 0, i.e. group ID 6 which is the same as that for LPN 2.

In FIG. 16, each macro cell is assigned different subsets of group IDs, which could be a simple strategy of assigning group IDs to transmission points (cells). However, the present disclosure is not limited thereto, and it is also possible that there are overlaps among group IDs assigned to different transmission points (cells).

According to the present embodiment, a transmission point device (for example, 700) may further comprises a notification unit (not shown) which notifies the UE which group ID in a group ID table configured (sent) to the UE through higher layer signaling is to be used through physical layer signaling, in which the group ID table is a subset of the whole group ID space and it contains available group IDs for the UE. Accordingly, the random seed generation unit (for example, 701) of the transmission point device generates a random seed based on the notified group ID.

According to the present embodiment, a UE (for example, 800) may further receives by its transceiver unit (for example, 801) physical layer signaling from a transmission point device, wherein the physical layer signaling notifies the UE which group ID in a group ID table configured (sent) to the UE through higher layer signaling is to be used, wherein the group ID table is a subset of the whole group ID space and contains available group IDs for the UE.

With the group ID table described in this embodiment, the system has the flexibility to facilitate different cases: in some cases, for example when a UE needs fast switching among different DMRS random seeds, physical layer signaling can be used; in some other cases, for example when a UE moves from the center to the edge of a transmission point (cell), the system can reconfigure the group ID table for the UE through the higher layer signaling. Due to the feasibility of reconfiguration of a group ID table, each group ID table can contain a limited number of group IDs, which means that the signaling overhead of using physical layer signaling to notify the UE which group ID in the group ID table is to be used is not very high.

Eighth Embodiment

Although combining higher layer signaling and physical layer signaling to configure a group ID to a UE provides the flexibility to meet different requirements on DMRS random seeds, one remaining problem is how to decide the blind detection space for a UE. One straightforward way is that the UE regards the group ID table configured from high layer signaling as the blind detection space (UE assumes that all group id in the table may generate interference to it). However, the number of group IDs contained in the group ID table may change, for example, as shown in FIG. 16, the group ID tables configured to the macro cells 1-3 respectively contain two, three and five available group IDs. Furthermore, on design of a blind detector, a UE needs to facilitate the maximum blind detection space, that is, maximum number of potential interfering random seeds. Therefore, the method of regarding the entire group ID table as the blind detection space will degrade the blind detection performance or reliability. Recall that in rel-10, the blind detection space is restricted into only 2 random seeds as described in the BACKGROUND part with reference to FIG. 6.

Thus, the solution of the present embodiment is that the physical layer signaling described in the seventh embodiment contains two parts:
  Part I: notify the UE which group ID in the group ID table is to be used for the UE; and
  Part II: notify the UE which group IDs in the group ID table are to be used for another UE which interferes with the UE.

In such case, the blind detection space for the UE is composed of the group ID notified by Part I and the group IDs notified by Part II. Thus, the blind detection on the UE side is then performed within the blind detection space notified from Part I and Part II of the physical layer signaling.

By notifying a UE of the blind detection space through physical layer signaling, the blind detection space for the UE may be limited instead of being the entire group ID table.

Ninth Embodiment

In the eighth embodiment, both the group ID for the UE notified from Part I and the group IDs for the another UE notified from Part II are selected from the group ID table configured (sent) to the UE through higher layer signaling. In other words, the candidate group IDs for Part I and Part II are the same, both from the configured group ID table.

However, in fact, for Part II, the another UE could be a UE in the same transmission point (cell) as that of the UE (MU case) or in a different transmission point (cell) from that of the UE, that is, candidate group IDs for Part I and Part II could be same or different according to different cases. For example, for a MU case where UEs are near center of a transmission point (cell), UEs may switch quickly between MU and SU states, thus candidate group IDs for Part I and Part II are the same, both from the group ID table configured (sent) to the UE through higher layer signaling. On the other hand, when a UE moves to the edge of a transmission point (cell), the another UE is most likely in a neighbor transmission point (cell) and accordingly the candidate group IDs for Part II is most likely from the group ID table configured to the neighbor transmission point (cell). In such a case, candidate group IDs for Part I and Part II are different.

Based on the above analysis, it is proposed to configure (sent) a structured group ID table to a UE through higher layer signaling, such as RRC (Radio Resource Control), in the present embodiment. Specifically, a structured group ID table configured to a UE through higher layer signaling may consist of two sets, for example, Set 1 and Set 2, wherein: the group ID to be used for DMRS random seed for the UE is selected from Set 1, or Part I of the physical layer signaling as described above is within Set 1; and the group ID to be used for DMRS random seed for another UE interfering with the UE is selected from Set 1 or Set 2, or Part II of the physical layer signaling is within Set 1 or Set 2.

FIG. 17 shows an example of a structured group ID table configured to a UE through higher layer signaling according to the present embodiment. One detailed example is shown in FIG. 17. In the structured group ID table, for example, Set 1 and Set 2 each contain two group IDs. Specifically, Set 1 contains two indexes 0, 1 and the corresponding group IDs, i.e. id 0 and id 1, while Set 2 contains two indexes 2, 3 and the corresponding group IDs, i.e. id 2 and id 3. One case is that Set 1 is used in a local transmission point (cell) and Set 2 is used for an interfering transmission point (cell). That is, id 0 and id 1 in Set 1 are two available group IDs for UEs in the local transmission point, and id 2 and id 3 in Set 2 are two available group IDs for UEs in the interfering transmission point.

Accordingly, for a MU case (for example, near the center of the local transmission point), group IDs notified by Part I and Part II of the physical layer signaling are both selected from Set 1 of the structured group ID table since the UE itself and the interfering UE (another UE interfering with the UE) are both in the local transmission point. On the other hand, when a UE moves to the edge of the local transmission point, the group ID notified by Part I is still selected from Set 1 while the group ID by Part II is selected from Set 2 since the interfering UE is most likely in the interfering transmission point such as an adjacent transmission point to the local transmission point where the UE itself is located.

As described above, the group ID notified by Part I of physical layer signaling is always selected from Set 1 of the structured group ID table configured to a UE while the group ID by Part II is selected either in Set 1 or in Set 2. Thereby, in such a case, only 1 bit is required for Part I and Part II respectively in physical layer signaling. The other overhead is 1 bit signaling to indicate the switch between Set 1 and Set 2 for selection of the group ID notified by Part II, which is not very frequently sent because it generally occurs with UE's mobility.

Without this structured group ID table, in the case that there are four candidate group IDs in total, 2 bits are required for Part I and Part II respectively. Therefore, 50% physical layer signaling overhead reduction is achieved due to the structured group ID table configured (sent) to a UE through higher layer signaling.

Although each set of the structured group ID table configured to the UE through higher layer signaling contains two available group IDs in this embodiment, the present disclosure is not limited thereto and the method of the disclosure may be extended to cases of multiple layers of signals multiplexed, that is, each set of the structured group ID table configured to the UE through higher layer signaling may contain multiple available group IDs for multiple layers of signals.

In the next embodiment, we will use a detailed example to further show how to design the corresponding physical layer signaling with the structured group ID table.

Tenth Embodiment

In the third embodiment as described above, it has showed how to re-use a table as defined in TS 36.212 shown in FIG. 11 to notify a UE of DMRS ports and DMRS random seeds. In the present embodiment, a similar method can be re-designed to facilitate the structured group ID table configured (sent) to a UE through high layer signaling as described above. Specifically, physical layer signaling may consist of three parts:

Part I: notify the UE which group ID selected from Set 1 is to be used for DMRS for this UE;

Part II: notify the UE which group ID selected from Set 1 or Set 2 is to be used for another UE interfering with this UE; and Part III: notify the UE of the switch between Set 1 and Set 2 as the interfering random seed space (interfering group ID space) from which the group ID notified by Part II is selected.

FIG. 18 shows a table used for Part I of physical layer signaling according to the present embodiment. For Part I, the table shown in FIG. 11 may be re-designed as in the table shown in FIG. 18. For the purpose of simplicity, only a case of one codeword with one layer multiplexed is illustrated in FIG. 18, but it is not limiting of the present disclosure. As shown in FIG. 18, with respect to same values 0-4, two columns "Message, Rel-10" and "Message, Rel-11" respectively indicate the corresponding combinations of DMRS ports and random seeds in release-10 and release-11. Specifically, in release-11, DMRS ports corresponding to the values are same as those in release-10, and the group ID (i.e. index) used for the DMRS random seed may be indicated by SCID in release 10. Thereby, no new bit is required for notifying a UE of the DMRS random seed. Here, "index" in the table of FIG. 18 represents the "index" in the structured group ID table of FIG. 17.

For Part II, one additional new bit is required to notify the UE of the exact index corresponding to the group ID to be used for the interfering UE (the another UE interfering with the UE) in the structured group ID table as shown in FIG. 17.

FIG. 19 shows a table used for Part III of physical layer signaling according to the present embodiment. For Part III, the table in FIG. 11 can be re-designed as in the table shown in FIG. 19. Specifically, the previously reserved value "7" in release-10 is now re-used as a switch signal indicating the switch of the interfering random seed space (interfering group ID space), for example between Set 1 and Set 1 in the structured group ID table as shown in FIG. 17.

It is easily found that Part I and Part III are both notified to a UE through the current L1 signaling (for example, the current DCI format 2C), thus only one of Part I and Part III can be notified to the UE through the current L1 signaling every time when sending physical layer signaling to the UE. Subsequently, the next question is which DMRS random seed and which DMRS port are to be used for the UE when a transmission point device such as an eNB send the reserved value ("7") to the UE. To solve it, it is possible to set the following rules for this case:

1) the additional new bit in this case is used to indicate the group ID to be used for the DMRS random seed for the UE in Set 1, that is, Part I instead of Part II, to the UE;

2) the UE is fixed to use port 7 (OCC [1,1]) or port 8 (OCC [1,−1]); and 3) the blind detection space for the UE in this case is within Set 1.

Figure 20B:
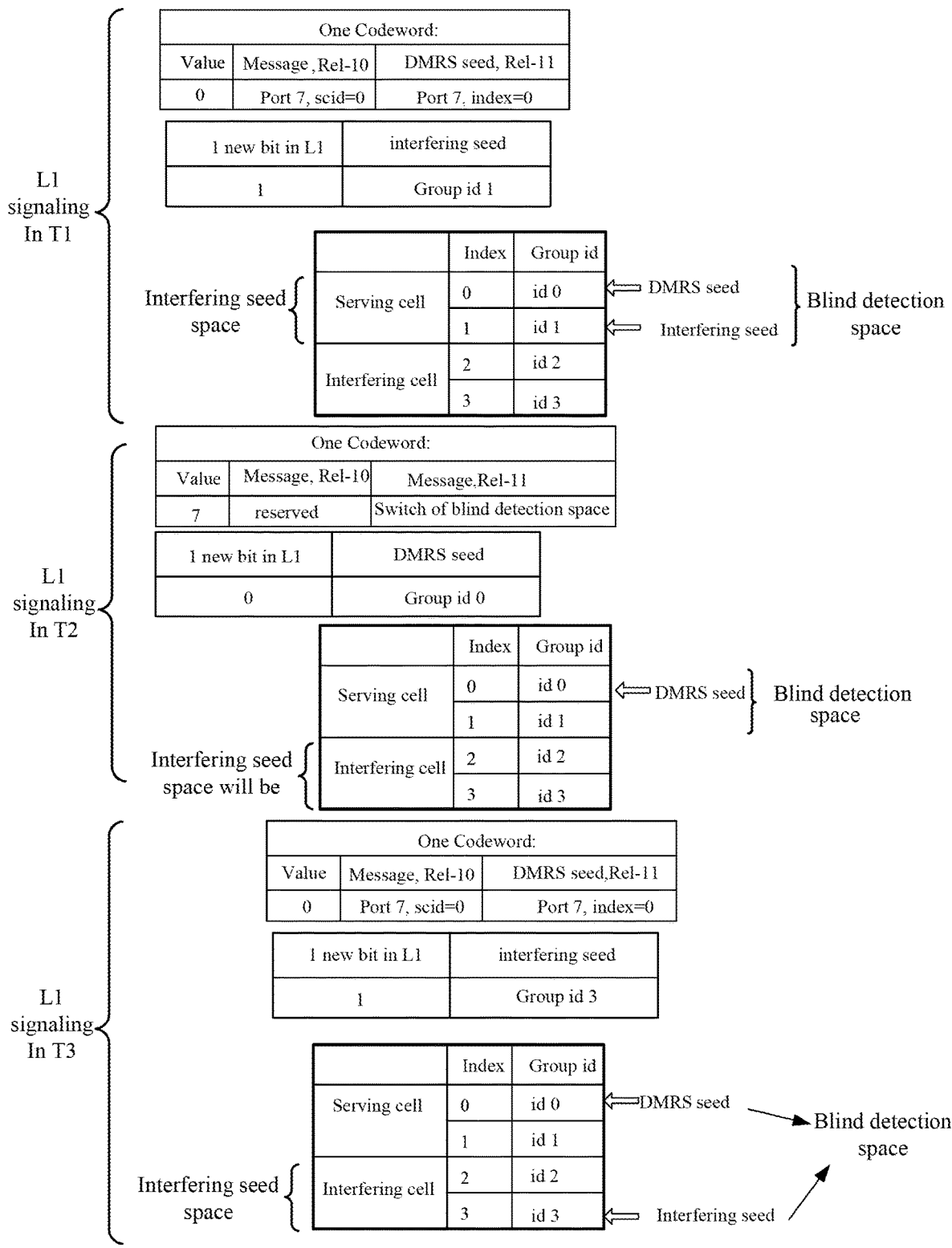

FIGS. 20A and 20B are schematic diagrams showing a complete example where a transmission point use the higher layer signaling and physical layer signaling as defined in the ninth and the tenth embodiments to configure a UE when the UE moves from the center to the edge of the transmission point.

As shown in FIG. 20A, there are two cells (transmission points) 1-2 (eNB1 and eNB2). In the transmission point 1, it is assumed that UE 1 and UE2 are in MU operation at time T1, thus UE2 is the interfering UE to UE 1 at this time. Then, UE 1 is moving from the center to the edge of the transmission point 1 at time T2. Thereafter, at time T3, UE 1 arrives at the edge of the transmission point 1, and UE 3 in the transmission point 2 become the UE interfering with UE 1 at this time.

In this example, UE 1 is configured with the structured group ID table as shown on the left of the figure through higher layer signaling such as RRC. The structured group ID table for UE 1 contains two sets "Serving cell" and "Interfering cell", which are named for better expressing its content and substantially equivalent to Set 1 and Set 2 as defined above. Specifically, the set of "Serving cell" contains two available group IDs for UE 1 and it is a subset of the whole group ID space and assigned to UEs in the transmission point 1 which functions as the serving cell (transmission point) for UE 1. The set of "Interfering cell" contains two available group IDs for UEs in the interfering cell (transmission point) to UE 1, for example the transmission point 2 in this example, and is also a subset of the whole group ID space. It is easily seen in this example that id 0 and id 1 in "Serving cell" are available group IDs for UE 1 and UE 2 and id 2 and id 3 are available group IDs for UE 3.

Similarly, UE 3 is also configured with the structured group ID table as shown on the right of the figure through higher layer signaling such as RRC. In contrast to UE 1, for UE 3, its serving cell (transmission point) is the transmission point 2 and its interfering cell (transmission point) is the transmission point 1, thus "Serving cell" contains id 2 and id 3 as available group IDs for UE 3 while "Interfering cell" contains id 0 and id 1 as available group IDs for UEs in the interfering cell to UE 3, for example the transmission point 1 in this example.

As described above, FIG. 20A shows the structured group ID tables configured (sent) to UEs through higher layer signaling in this example. In the following, with reference to FIG. 20B, notification to UE 1 through physical layer signaling (L1 signaling) during the time when UE 1 moves from the center to the edge of the transmission point 1 will be discussed in detail.

On the top of FIG. 20B, the L1 signaling sent to UE 1 at time T1 is shown. Specifically, UE 1 is notified to use port 7 and id 0 with value "0" by re-designing the table as shown in FIG. 11 as described above. In addition, one additional new bit is used to notify UE 1 of the group ID to be used for the interfering UE, for example, "1" indicates id 1. That is because at time T1 UE 1 and UE 2 are in MU operation, that is, UE 2 is considered as the interfering UE to UE 1. In this case, the interfering random seed space is just the range of "Serving cell" in the structured group ID table configured to UE 1, therefore, the blind detection space for UE 1 is defined as within "Serving cell".

In the middle of FIG. 20B, the L1 signaling sent to UE 1 at time T2 is shown. Specifically, UE 1 is notified of the switch of the interfering random seed space with value "7" which is reserved in the table as shown in FIG. 11 by re-designing, which means that the interfering random seed space will be changed from "Serving cell" to "Interfering cell". Then, different from T1, at T2 the additional new bit is now used to notify UE 1 of the group ID to be used for its own DMRS random seed, for example, "0" indicates id 0. According to the rules as described above, in such case, UE 1 is fixed to port 7 or port 8, thus no additional bit is required to notify UE 1 which DMRS port is to be used. Furthermore, since UE 1 is in motion at T2, its interfering UE is not required to be notified to UE 1 and accordingly no other new bit is necessary. In such case, according to the rules as described above, the blind detection space remains unchanged, that is, within "Serving cell" in the structured group ID table for UE 1.

On the bottom of FIG. 20B, the L1 signaling sent to UE 1 at time T3 is shown. At this time UE 1 has arrived at the edge of the transmission point 1, thus the L1 signaling at this time is similar with that of T1. Specifically, UE 1 is still notified to use port 7 and id 0 with value "0" by re-designing the table as shown in FIG. 11 as described above. In addition, one additional new bit in L1 signaling is also used to notify UE 1 of the group ID to be used for the interfering UE. Since now the interfering UE is UE 3 in the transmission point 2 instead of UE 1 in the transmission point 1 and UE 1 is already notified of the switch of the interfering random seed space at T2, the interfering random seed space is now "Interfering cell" in the structured group ID table for UE 1, and the group ID to be used for the interfering UE at this time is selected from "Interfering cell", for example, "1" here indicates id 3. In this case, the blind detection space for UE 1 is defined as within the range of the DMRS random seed for UE 1 and the interfering random seed (the random seed for the interfering UE), that is, id 0 and id 3.

By fully utilizing the redundancy on the current L1 signaling to indicate the blind detection space to a UE for a MU case or a UE side ICIC case, the blind detection space of the UE is limited and the signaling overhead is reduced.

Eleventh Embodiment

Figure 21:
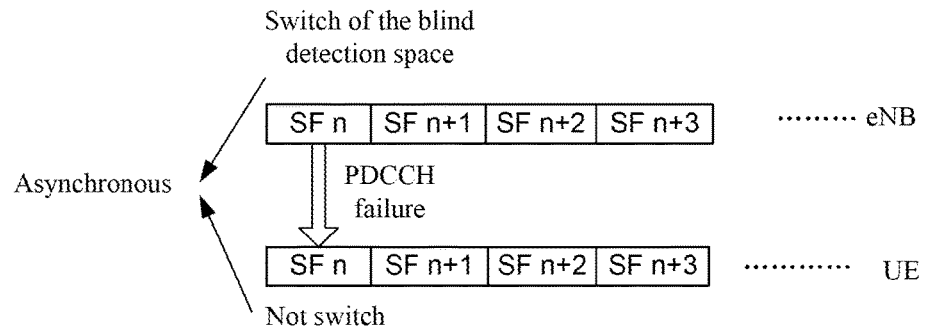
FIG. 21 is a schematic diagram showing a case that physical layer signaling is lost due to PDCCH failure according to the eleventh embodiment of the present disclosure.

One problem of the tenth embodiment is that it is possible that physical layer signaling is lost due to PDCCH detection failure. FIG. 21 is a schematic diagram showing a case that physical layer signaling is lost due to PDCCH failure according to the present embodiment. As shown in FIG. 21, if eNB sends UE a reserved value (Part III) to notify UE of the switch between Set 1 and Set 2 as described above, but UE does not receive it, then there will be asynchronization between eNB and UE. That is, eNB may have switched the interfering random seed space (interfering group ID space) for example from Set 1 to Set 2 while UE still maintain the interfering random seed space unchanged. The solution is to combine an Ack/Nck (Acknowledge/Non-acknowledge) process to overcome such PDCCH detection failure.

Now, as an example, a DL (Downlink) Ack/Nck process is briefly introduced as follows. In LTE or LTE-A, in order to prevent physical layer message loss, there is an Ack/Nck mechanism between UE and eNB. Specifically, for DL, on subframe n (SF n), if UE receives a message and successfully decode it, UE will send Ack signal to eNB on subframe n+4 (SF n+4); if UE receives a message and decode it in error, UE will send Nck signal to eNB on SF n+4. Based on the Ack or Nck signal from UE on SF n+4, eNB will know if the message sent on SF n is successfully received and decoded by UE. If eNB receives nothing on SF n+4, eNB will assume that the message sent on SF n is lost during transmission.

Figure 22:
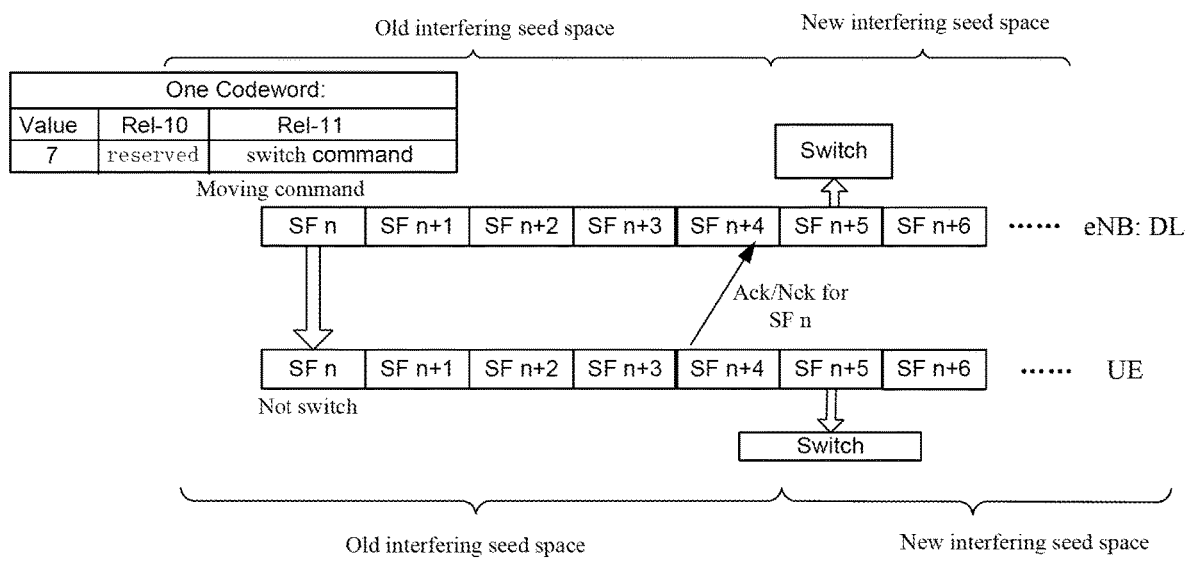
FIG. 22 is a schematic diagram showing a case that the asynchronization between eNB and UE is avoided by combining with an Ack/Nck mechanism according to the eleventh embodiment of the present disclosure.

Combined with such an Ack/Nck process, the asynchronization between eNB and UE can be avoided. FIG. 22 is a schematic diagram showing a case that the asynchronization between eNB and UE is avoid by combining with the Ack/Nck mechanism according to the present embodiment. As shown in FIG. 22, if UE receives a reserved value "7" or a switch commend on SF n, UE and eNB will not change or switch the interfering random seed space immediately. Instead, UE and eNB will use the un-switched interfering random seed space until SF n+4 and UE sends Ack/Nck signal to eNB on SF n+4. On SF n+5, if eNB receives the Ack/Nck signal sent from UE, both the eNB and UE switch the interfering random seed space synchronously; if eNB receives nothing from UE, neither eNB nor UE switches the interfering random seed space. This procedure intends for the exception case that although eNB sends a switch command on SF n to UE, UE actually receives nothing (maybe due to the severe channel condition).

With respect to the switch of the interfering random seed space (or the blind detection space), by combining with an Ack/Nck mechanism, the asynchronization between eNB and UE can be avoided.

Although physical layer signaling is used to notify a UE of a group ID to be used for the UE and a group ID to be used for another UE interfering with the UE in the seventh to tenth embodiments, the present invention is not limited thereto. It should be noted that it is also possible that using UE specific higher layer signaling such as RRC signaling to notify a UE about the indexes (group IDs) of DMRS random seed (for the UE) and interfering DMRS random seed (for the interfering UE) based on a group ID table or a structured group ID table configured (sent) to the UE from higher layer signaling previously. In this case, there is no worry about the loss of signaling in transmission since RRC has its own signaling protection mechanism.

According to the present embodiment, the notification unit (not shown) of a transmission point device (for example, 700) may notify the UE which group ID in a group ID table configured (sent) to the UE through higher layer signaling is to be used through physical layer signaling or UE specific higher layer signaling, in which the group ID table is a subset of the whole group ID space and it contains available group IDs for the UE.

According to the present embodiment, a UE (for example, 800) may further receives by its transceiver unit (for example, 801) physical layer signaling or UE specific higher layer signaling from a transmission point device, wherein the physical layer signaling or the UE specific higher layer signaling notifies the UE which group ID in a group ID table configured (sent) to the UE through higher layer signaling is to be used, wherein the group ID table is a subset of the whole group ID space and contains available group IDs for the UE.

Twelfth Embodiment

In the present disclosure, three kinds of IDs, that is, cell ID, UE specific ID and group ID, as described above can all be used for DMRS and blind detection. Although the forgoing seventh to eleventh embodiments all focus on configuration of a group ID table to a UE, the present disclosure is not limited to it. Instead, the group ID table as described in the seventh embodiment (as shown in FIG. 16) or in the ninth embodiment (as shown in FIG. 17), may be extended to a more general case that it can be an "x" ID table. Such "x" ID could be one kind of ID or could be two or more kinds of IDs. When "x" ID is a group ID specifically, the seventh to eleventh embodiments are the exact examples.

FIG. 23 shows an example of a structured "x" ID table configured to a UE through higher layer signaling according to the present embodiment. In the example of FIG. 23, "x" ID are two kinds of IDs, i.e. cell ID and UE specific ID. Specifically, the structure of the "x" ID table in FIG. 23 is similar with that of the group ID table in FIG. 17. The difference between them is that in FIG. 23 Set 1 contains serving cell ID 1 and UE specific ID 1 as available IDs for the UE and Set 2 contains serving cell ID 2 and UE specific ID 2 as available IDs for an interfering UE to the UE. That is to say, both cell ID and UE specific ID are available for the UE and the interfering UE in this case.

Recall that in the third embodiment on MU operation, a UE is switched back to a cell ID case to enable the blind detection. However, with the structured "x" ID table of FIG. 23, the UE specific ID can also be available to the UE side for the blind detection since the blind detection space for the UE is within the structured "x" ID table and can be further limited to a small range of IDs by combining physical layer signaling design.

Here, since the "x" ID table is structured with Set 1 and Set 2 similarly as the structured group ID table in the ninth embodiment, corresponding physical layer signaling design in the tenth and eleventh embodiments can be re-used in this case, the detailed description of which is omitted here for avoiding redundancy.

It is noted that "x" ID is not restricted to three kinds of ID as described in the present disclosure. It is easy for those skilled in the art to extend it to any other kind of IDs.

Thirteenth Embodiment

FIG. 24 is a diagram showing a flow chart of a method of scrambling signals according to the present embodiment.

As shown in FIG. 24, the method 2400 according to the thirteenth embodiment of the present disclosure is used for scrambling signals assigned on predetermined radio resources of at least one layer of resource blocks with the same time and frequency resources. In the step S2401, an ID table is sent to a UE through higher layer signaling, the ID table being a subset of the whole ID space and containing available IDs for the UE. In the step S2402, the UE is notified of an ID in the ID table to be used through physical layer signaling or UE specific higher layer signaling. In the step S2403, a random seed is generated based on the notified ID. In the step S2404, a scrambling sequence is initialized by the random seed. In the step S2404, the signals are scrambled with the initialized scrambling sequence.

According to the present embodiment, the above step S2403 can be executed by the random seed generation unit 701, the above step S2404 can be executed by the initiation unit 702, and the above step S2405 can be executed by the scrambling unit 703. Further, the above step S2402 can be executed by a notification unit (not shown) of the transmission point device 700.

According to the present embodiment, the physical layer signaling may comprise: a first part which notifies the UE which ID in the ID table is to be used for the UE; and a second part which notifies the UE which IDs in the ID table are to be used for another UE interfering with the UE.

According to the present embodiment, the ID table may be structured to contain a first set and a second set, wherein the ID for use of the UE is selected from the first set, and the ID for use of another UE interfering with the UE is selected from either the first set or the second set.

According to the present embodiment, the first part may be notified to the UE by using signaling set with one codeword, wherein four values in the one codeword respectively indicate the following four configuration cases of one layer of signals: a first port and a first ID; the first port and a second ID; a second port and the first ID; and the second port and the second ID. And the second part may be notified to the UE by a new bit.

According to the present embodiment, the physical layer signaling may comprise: a first part which notifies the UE which ID in the first set of the ID table is to be used for the UE; and a third part which notifies the UE the switch between the first set and the second set as the interfering ID space from which the ID to be used for the another UE is selected.

According to the present embodiment, the first part may be notified to the UE by a new bit, and the third part may be notified to the UE by using signaling set with one codeword in which a reversed value indicates the switch between the first set and the second set. Wherein, the UE may be fixed to use a first port or a second port, and the blind detection space for the UE may be unchanged.

According to the present embodiment, when the UE receives the third part sent from a transmission point device on subframe n, the UE may send Acknowledge or Non-acknowledge signal to the transmission point device on subframe n+4. If the transmission point device receives the Acknowledge or Non-acknowledge signal sent from the UE, both the transmission point device and the UE performs the switch on subframe n+5; otherwise if the transmission point device receives neither Acknowledge nor Non-acknowledge signal from the UE, neither the transmission point device nor the UE performs the switch.

According to the present embodiment, the IDs in the ID table are one or more of group ID, cell ID and UE specific ID.

According to the present embodiment, a random seed based on the group ID may be generated from the equation (5).

According to the present embodiment, the signals may be one of reference signals, control signals for control channels, and data signals for data channels.

According to the present embodiment, by combining physical layer signaling and higher layer signaling to notify the used group ID and the blind detection space to a UE, the blind detection for the UE is enabled and the signaling overhead is reduced.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of those skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

With respect to the use of substantially any plural and/or singular terms herein, those having skills in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A communication apparatus comprising:
   circuitry, which, in operation, generates a reference signal, the reference signal being based on a sequence that is initialized with a random seed count generated by $c_{init} = (\lfloor n_s/2 \rfloor + 1) \cdot (2ID+1) \cdot 2^{16} + SCID$, the random seed being one of a first random seed and a second random seed, the first random seed being generated using ID specific to a cell, and the second random seed being generated using ID dedicated to a user equipment (UE),
   wherein, $n_s$ is a slot number, SCID is 0 or 1, and the ID is determined based on the SCID; and
   a transmitter, which, in operation, transmits the reference signal to the UE.

2. The communication apparatus according to claim 1, wherein a plurality of IDs for the second random seed are grouped in two sets, and said transmitter, in operation, transmits information that indicates one set out of the two sets.

3. The communication apparatus according to claim 1, wherein the ID for the second random seed is dedicatedly notified to the UE.

4. The communication apparatus according to claim 1, wherein the ID for the second random seed is a group ID shareable by a plurality of UEs.

5. The communication apparatus according to claim 1, wherein the transmitter, in operation, transmits the reference signal that is scrambled with the sequence.

6. The communication apparatus according to claim 1, wherein the reference signal is a demodulation reference signal (DMRS).

7. A communication method comprising:
   generating a reference signal, the reference signal being based on a sequence that is initialized with a random seed count generated by $c_{init} = (\lfloor n_s/2 \rfloor + 1) \cdot (2ID+1) \cdot 2^{16} + SCID$, the random seed being one of a first random seed and a second random seed, the first random seed being generated using ID specific to a cell, and the second random seed being generated using ID dedicated to a user equipment (UE),
   wherein, $n_s$ is a slot number, SCID is 0 or 1, and the ID is determined based on the SCID; and
   transmitting the reference signal to the UE.

8. The communication method according to claim 7, wherein a plurality of IDs for the second random seed are grouped in two sets, and the communication method comprises transmitting information that indicates one set out of the two sets.

9. The communication method according to claim 7, wherein the ID for the second random seed is dedicatedly notified to the UE.

10. The communication method according to claim 7, wherein the ID for the second random seed is a group ID shareable by a plurality of UEs.

11. The communication method according to claim 7, wherein the transmitting includes transmitting the reference signal that is scrambled with the sequence.

12. The communication method according to claim 7, wherein the reference signal is a demodulation reference signal (DMRS).

* * * * *